US007310666B2

(12) United States Patent
Benfield et al.

(10) Patent No.: US 7,310,666 B2
(45) Date of Patent: Dec. 18, 2007

(54) METHOD AND SYSTEM FOR RESTRICTING AND ENHANCING TOPOLOGY DISPLAYS FOR MULTI-CUSTOMER LOGICAL NETWORKS WITHIN A NETWORK MANAGEMENT SYSTEM

(75) Inventors: Jason Benfield, Austin, TX (US); Oliver Yehung Hsu, Austin, TX (US); Lorin Evan Ullmann, Austin, TX (US); Julianne Yarsa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 09/895,143

(22) Filed: Jun. 29, 2001

(65) Prior Publication Data

US 2003/0009547 A1    Jan. 9, 2003

(51) Int. Cl.
*G06F 15/173* (2006.01)
*G06F 15/177* (2006.01)

(52) U.S. Cl. ............... 709/223; 709/245; 715/735; 715/736

(58) Field of Classification Search ............ 709/223, 709/224, 226, 245; 715/735, 736
See application file for complete search history.

(56) References Cited

U.S. PATENT DOCUMENTS

| 5,910,803 | A | * | 6/1999 | Grau et al. | 345/734 |
| 6,067,093 | A | * | 5/2000 | Grau et al. | 345/440 |
| 6,438,591 | B1 | * | 8/2002 | Fehskens et al. | 709/223 |
| 6,477,572 | B1 | * | 11/2002 | Elderton et al. | 709/224 |
| 7,103,807 | B2 | * | 9/2006 | Bosa et al. | 714/43 |
| 7,237,138 | B2 | * | 6/2007 | Greenwald et al. | 714/4 |
| 2002/0013837 | A1 | * | 1/2002 | Battat et al. | 709/223 |
| 2002/0152297 | A1 | * | 10/2002 | Lebourg et al. | 709/223 |
| 2003/0051195 | A1 | * | 3/2003 | Bosa et al. | 714/43 |
| 2003/0056140 | A1 | * | 3/2003 | Taylor et al. | 714/4 |

* cited by examiner

*Primary Examiner*—Andrew Caldwell
*Assistant Examiner*—Douglas Blair
(74) *Attorney, Agent, or Firm*—Duke W. Yee; Jeffrey S. Labaw; Wayne P. Bailey

(57) ABSTRACT

A method, system, apparatus, and computer program product are presented for management of a distributed data processing system on behalf of a plurality of management customers. A set of logical networks within the distributed data processing system and/or a set of physical networks in the distributed data processing system are associated with an anchor object. A topology map can be generated and displayed in which a root node of the topology map is the anchor object. Each anchor object is uniquely associated with a customer for which the distributed data processing system is managed. The topology display can be restricted such that portions of topology information are displayed to an administrative user in accordance with the authorized security access of the user.

44 Claims, 21 Drawing Sheets

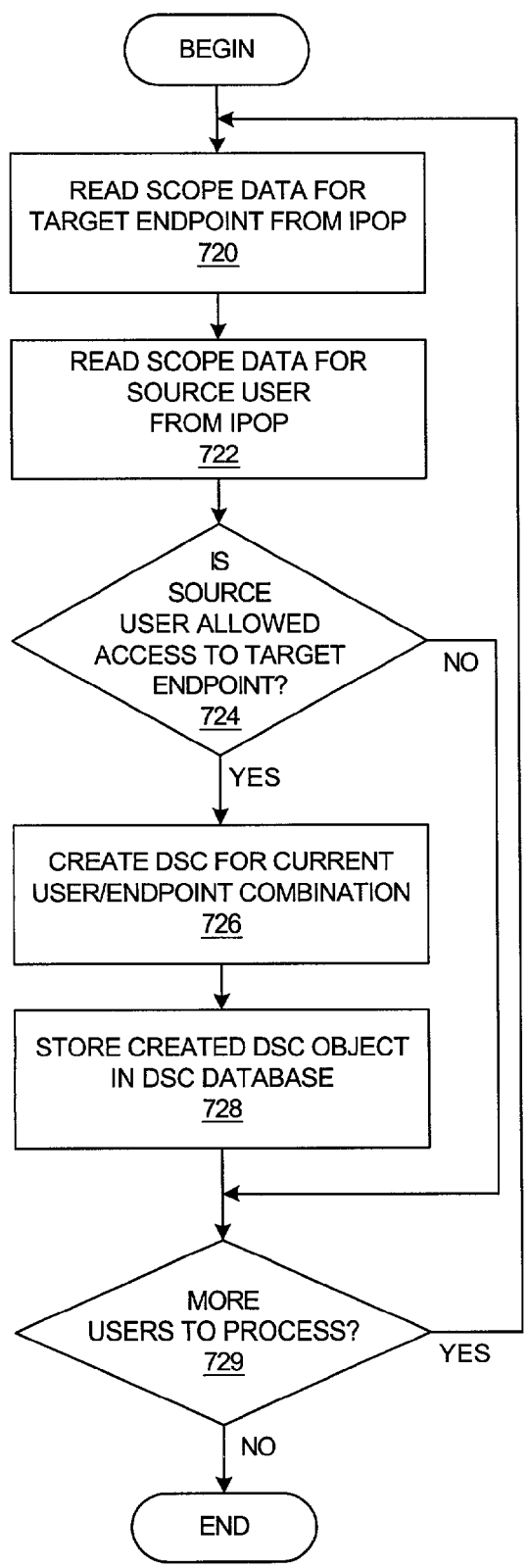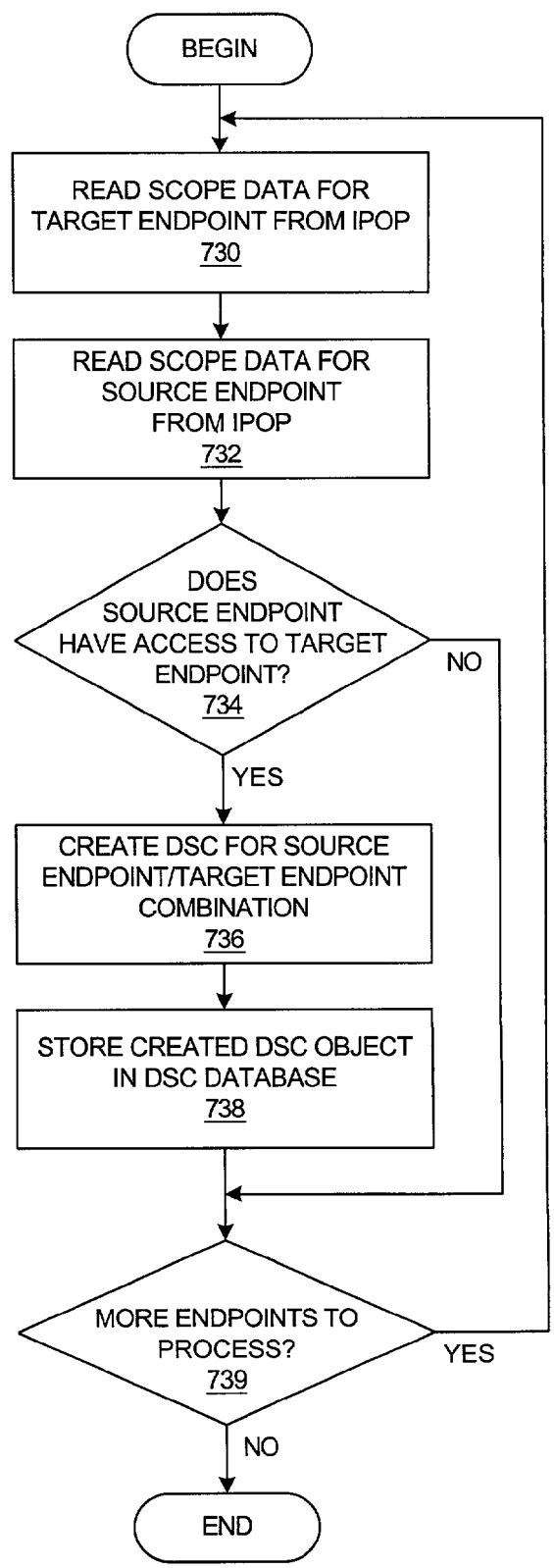
FIG. 7C
FIG. 7D

```
Public Class IPActionObject {

Endpoint sourceEP;
    Endpoint targetEP;

// CONSTRUCTOR
    IPActionObject( Endpoint targetEP, Endpoint sourceEP ) {
        .
        .
        .
    }
    VOID performAction( ) // EXECUTES ACTION METHOD
    .
    .
    .
}
```

FIG. 11B

```
Public Class Endpoint {

// public variables
    long        EPObjectID;     // ID to object (both private and public network addresses)
    InetAddress EPIPAddress;    // physical network address (private or public)
    long        EPVPN;          // virtual private network ID //get/set of variables
    public long         getObjectID( ) { ... }
    public InetAddress  getPAddress( ) { ... }
    public long         getVPN( ) { ... }

```
Public Class EndpointCustomer extends Endpoint { public getVPNGW( ) {
        //gets the only gateway which has access to a particular private network
        .
        .
        .
    }
    //private variables only set/accessed by EP creator IPOP
    long    customerHashNumber;
    String  customerName;
    String  customerAnchorPath;
    Long    objectIoFPrivateGatewayRoute

METHOD AND SYSTEM FOR RESTRICTING AND ENHANCING TOPOLOGY DISPLAYS FOR MULTI-CUSTOMER LOGICAL NETWORKS WITHIN A NETWORK MANAGEMENT SYSTEM

BACKGROUND OF THE INVENTION

1. Field of the Invention

The present invention relates to an improved data processing system and, in particular, to a method and system for multiple computer or process coordinating. Still more particularly, the present invention provides a method and system for network management.

2. Description of Related Art

Technology expenditures have become a significant portion of operating costs for most enterprises, and businesses are constantly seeking ways to reduce information technology (IT) costs. This has given rise to an increasing number of outsourcing service providers, each promising, often contractually, to deliver reliable service while offloading the costly burdens of staffing, procuring, and maintaining an IT organization. While most service providers started as network pipe providers, they are moving into server outsourcing, application hosting, and desktop management. For those enterprises that do not outsource, they are demanding more accountability from their IT organizations as well as demanding that IT is integrated into their business goals. In both cases, "service level agreements" have been employed to contractually guarantee service delivery between an IT organization and its customers. As a result, IT teams now require management solutions that focus on and support "business processes" and "service delivery" rather than just disk space monitoring and network pings.

IT solutions now require end-to-end management that includes network connectivity, server maintenance, and application management in order to succeed. The focus of IT organizations has turned to ensuring overall service delivery and not just the "towers" of network, server, desktop, and application. Management systems must fulfill two broad goals: a flexible approach that allows rapid deployment and configuration of new services for the customer; and an ability to support rapid delivery of the management tools themselves. A successful management solution fits into a heterogeneous environment, provides openness with which it can knit together management tools and other types of applications, and a consistent approach to managing all of the IT assets.

With all of these requirements, a successful management approach will also require attention to the needs of the staff within the IT organization to accomplish these goals: the ability of an IT team to deploy an appropriate set of management tasks to match the delegated responsibilities of the IT staff; the ability of an IT team to navigate the relationships and effects of all of their technology assets, including networks, middleware, and applications; the ability of an IT team to define their roles and responsibilities consistently and securely across the various management tasks; the ability of an IT team to define groups of customers and their services consistently across the various management tasks; and the ability of an IT team to address, partition, and reach consistently the managed devices.

Many service providers have stated the need to be able to scale their capabilities to manage millions of devices. When one considers the number of customers in a home consumer network as well as pervasive devices, such as smart mobile phones, these numbers are quickly realized. Significant bottlenecks appear when typical IT solutions attempt to support more than several thousand devices.

Given such network spaces, a management system must be very resistant to failure so that service attributes, such as response time, uptime, and throughput, are delivered in accordance with guarantees in a service level agreement. In addition, a service provider may attempt to support many customers within a single network management system. The service provider's profit margins may materialize from the ability to bill usage of a common management system to multiple customers.

On the other hand, the service provider must be able to support contractual agreements on an individual basis. Service attributes, such as response time, uptime, and throughput, must be determinable for each customer. In order to do so, a network management system must provide a suite of network management tools that is able to perform device monitoring and discovery for each customer's network while integrating these abilities across a shared network backbone to gather the network management information into the service provider's distributed data processing system. There is a direct relationship between the ability of a management system to provide network monitoring and discovery functionality and the ability of a service provider using the management system to serve multiple customers using a single management system. Preferably, the management system can replicate services, detect faults within a service, restart services, and reassign work to a replicated service. By implementing a common set of interfaces across all of their services, each service developer gains the benefits of system robustness. A well-designed, component-oriented, highly distributed system can easily accept a variety of services on a common infrastructure with built-in fault-tolerance and levels of service.

Distributed data processing systems with thousands of nodes are known in the prior art. The nodes can be geographically dispersed, and the overall computing environment can be managed in a distributed manner. The managed environment can be logically separated into a series of loosely connected managed regions, each with its management server for managing local resources. The management servers coordinate activities across the enterprise and permit remote site management and operation. Local resources within one region can be exported for the use of other regions in a variety of manners.

As with most organizations, an IT organization, such as a service provider, may classify its personnel into different managerial roles. Given a scenario in which a service provider is using an integrated network management system for multiple customers, it is most likely that many different individuals will be assigned to manage different customers, different regions, and different groups of devices. In addition, separate individuals may have different duties within similar portions of the network, such as deploying new devices versus monitoring the uptime of those devices, and the management system should be able to differentiate the roles of the individuals and to restrict the actions of any particular individual to those operations that are appropriate for the individual's role. In a highly distributed system comprising on the order of a million devices, the task of authenticating and authorizing the actions of many individuals per customer, per region, per device, etc., becomes quite complex.

In this type of environment, it would be valuable for an administrative user to be able to view management-related information through a variety of graphical user interfaces. Typically, a network management application displays information associated with the physical configurations of a set of networks, such as information pertaining to the status and type of devices or communication links within the distributed system; various types of icons or color-coding might be used to graphically differentiate the information so that an administrative user can view portions of networks in an easy-to-understand, graphical manner. However, for large distributed systems of more than a million devices, typical application displays would be filled with similar icons for most subnetworks, which would be rather monotonous for an administrative user, and most displays would also appear to be redundant. Even though a user might be able to display device identifiers concurrently with graphical icons in order to distinguish different devices and systems, the identifiers may also be similar to each other. In a highly distributed system with many customers and administrators using a common network management framework, graphical variations with respect to network-related information would be inadequate.

Moreover, it would be very valuable in a highly distributed environment for an administrative user to be able to request various presentation formats for the system's topology information within a graphical user interface. Typically, a network management application allows an administrative user to zoom a user perspective with respect to a graphical layout of a set of networks; as the user zooms in or out, more or less detail within the networks is displayed. In a highly distributed system with many customers and administrators using a common network management framework, varying the topology presentation format only with respect to levels of detail would be inadequate.

Therefore, it would be particularly advantageous to provide a method and system within a network management framework for displaying multi-customer information in a variety of presentation formats. It would be particularly advantageous for the network management system to provide an ability to view non-network-related information in conjunction with the presentation of the topology of a network.

SUMMARY OF THE INVENTION

A method, system, apparatus, and computer program product are presented for management of a distributed data processing system on behalf of a plurality of management customers. A set of logical networks within the distributed data processing system and/or a set of physical networks in the distributed data processing system are associated with an anchor object. A topology map can be generated and displayed in which a root node of the topology map is the anchor object. Each anchor object is uniquely associated with a customer for which the distributed data processing system is managed. The topology display can be restricted such that portions of topology information are displayed to an administrative user in accordance with the authorized security access of the user.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 7C is a flowchart depicting further detail of the initial DSC object creation process in which DSC objects are created and stored for an endpoint/user combination;

FIG. 7D is a flowchart depicting further detail of the initial DSC object creation process in which DSC objects are created and stored for an endpoint/endpoint combination;

FIGS. 11B-11D are some simplified pseudo-code examples that depict an object-oriented manner in which action objects and endpoint objects can be implemented;

DETAILED DESCRIPTION OF THE INVENTION

The present invention provides a methodology for managing a distributed data processing system. The manner in which the system management is performed is described further below in more detail after the description of the preferred embodiment of the distributed computing environment in which the present invention operates.

Figure 1:
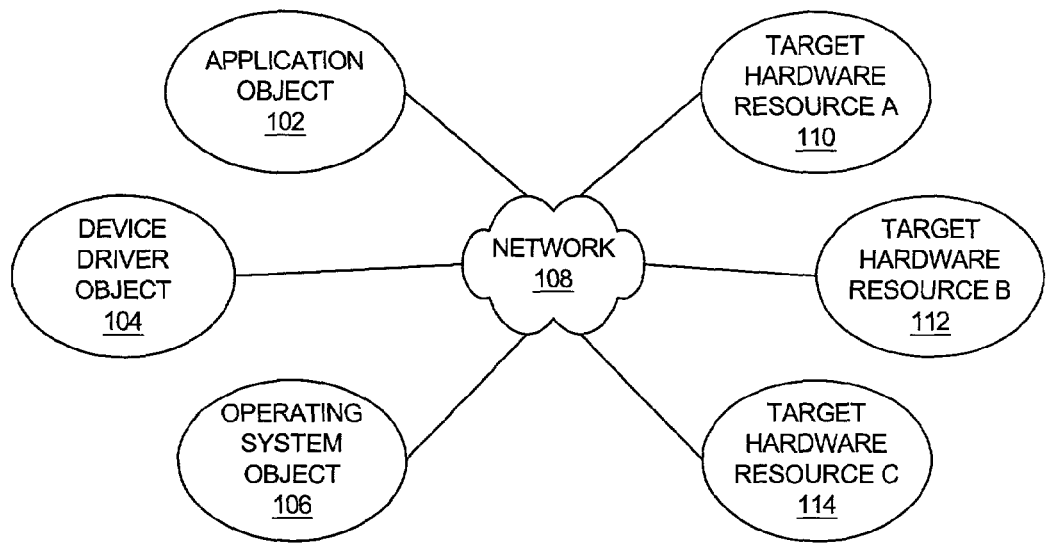
FIG. 1 is a diagram depicting a known logical configuration of software and hardware resources.

With reference now to FIG. 1, a diagram depicts a known logical configuration of software and hardware resources. In this example, the software is organized in an object-oriented system. Application object 102, device driver object 104, and operating system object 106 communicate across network 108 with other objects and with hardware resources 110-114.

In general, the objects require some type of processing, input/output, or storage capability from the hardware resources. The objects may execute on the same device to which the hardware resource is connected, or the objects may be physically dispersed throughout a distributed computing environment. The objects request access to the hardware resource in a variety of manners, e.g. operating system calls to device drivers. Hardware resources are generally available on a first-come, first-serve basis in conjunction with some type of arbitration scheme to ensure that the requests for resources are fairly handled. In some cases, priority may be given to certain requesters, but in most implementations, all requests are eventually processed.

Figure 2A:
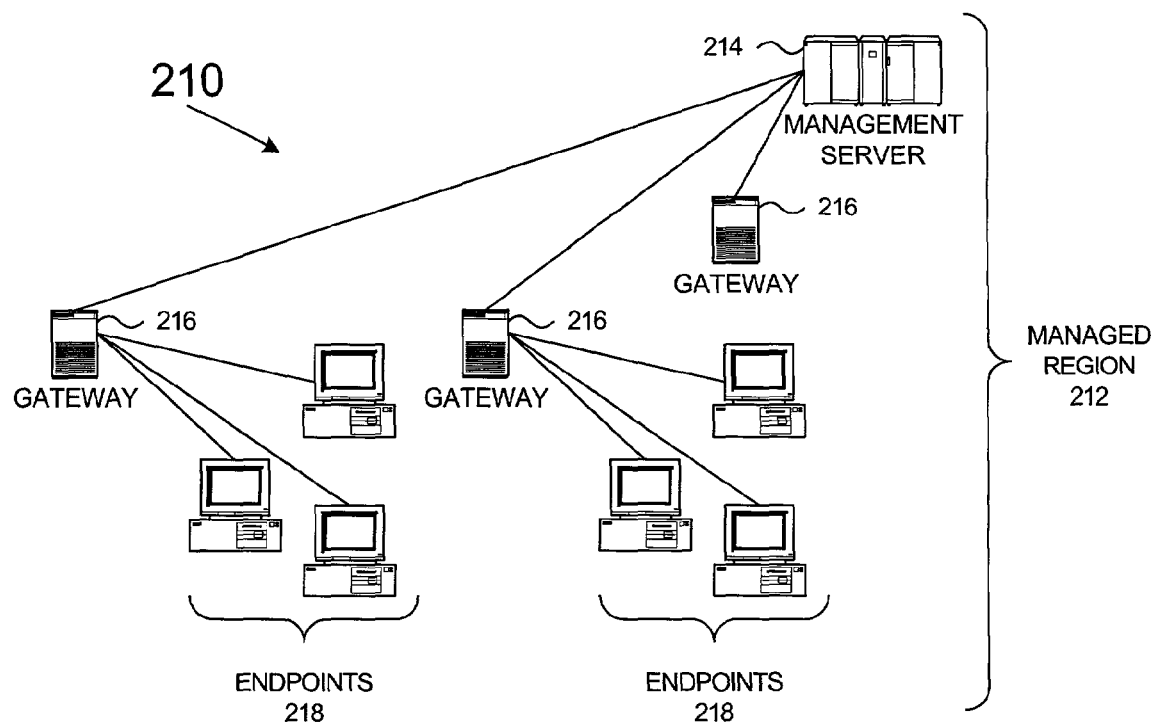
FIG. 2A is simplified diagram illustrating a large distributed computing enterprise environment in which the present invention is implemented.

With reference now to FIG. 2A, the present invention is preferably implemented in a large distributed computer environment 210 comprising up to thousands of "nodes". The nodes will typically be geographically dispersed and the overall environment is "managed" in a distributed manner. Preferably, the managed environment is logically broken down into a series of loosely connected managed regions (MRs) 212, each with its own management server 214 for managing local resources with the managed region. The network typically will include other servers (not shown) for carrying out other distributed network functions. These include name servers, security servers, file servers, thread servers, time servers and the like. Multiple servers 214 coordinate activities across the enterprise and permit remote management and operation. Each server 214 serves a number of gateway machines 216, each of which in turn support a plurality of endpoints/terminal nodes 218. The server 214 coordinates all activity within the managed region using a terminal node manager at server 214.

Figure 2B:
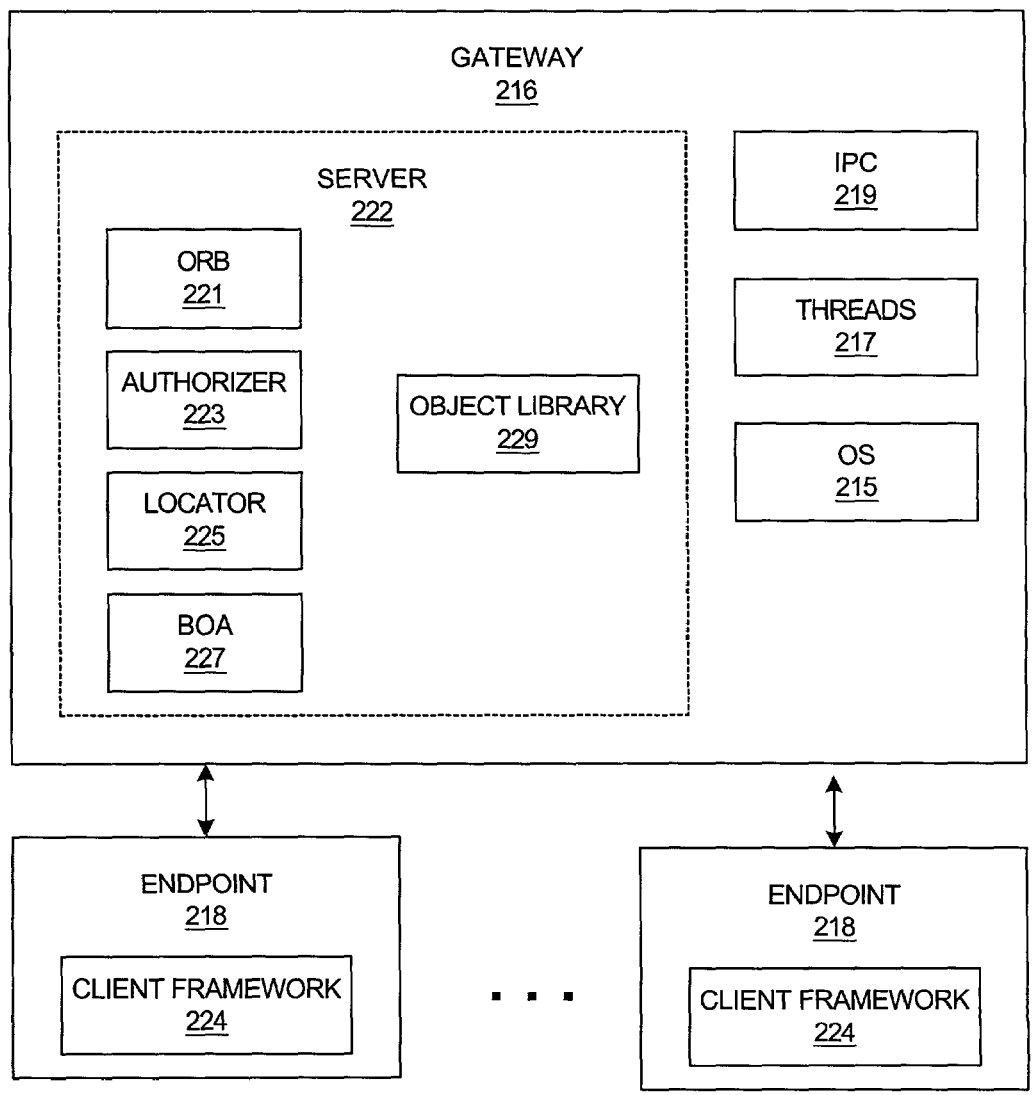
FIG. 2B is a block diagram of a preferred system management framework illustrating how the framework functionality is distributed across the gateway and its endpoints within a managed region.

With reference now to FIG. 2B, each gateway machine 216 runs a server component 222 of a system management framework. The server component 222 is a multi-threaded runtime process that comprises several components: an object request broker (ORB) 221, an authorization service 223, object location service 225 and basic object adapter (BOA) 227. Server component 222 also includes an object library 229. Preferably, ORB 221 runs continuously, separate from the operating system, and it communicates with both server and client processes through separate stubs and skeletons via an interprocess communication (IPC) facility 219. In particular, a secure remote procedure call (RPC) is used to invoke operations on remote objects. Gateway machine 216 also includes operating system 215 and thread mechanism 217.

The system management framework, also termed distributed kernel services (DKS), includes a client component 224 supported on each of the endpoint machines 218. The client component 224 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. It should be noted, however, that an endpoint may also have an ORB for remote object-oriented operations within the distributed environment, as explained in more detail further below.

Using an object-oriented approach, the system management framework facilitates execution of system management tasks required to manage the resources in the managed region. Such tasks are quite varied and include, without limitation, file and data distribution, network usage monitoring, user management, printer or other resource configuration management, and the like. In a preferred implementation, the object-oriented framework includes a Java runtime environment for well-known advantages, such as platform independence and standardized interfaces. Both gateways and endpoints operate portions of the system management tasks through cooperation between the client and server portions of the distributed kernel services.

In a large enterprise, such as the system that is illustrated in FIG. 2A, there is preferably one server per managed region with some number of gateways. For a workgroup-size installation, e.g., a local area network, a single server-class machine may be used as both a server and a gateway.

References herein to a distinct server and one or more gateway(s) should thus not be taken by way of limitation as these elements may be combined into a single platform. For intermediate size installations, the managed region grows breadth-wise, with additional gateways then being used to balance the load of the endpoints.

The server is the top-level authority over all gateways and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoints and gateways, and this mapping is preferably dynamic.

As noted above, there are one or more gateways per managed region. Preferably, a gateway is a fully managed node that has been configured to operate as a gateway. In certain circumstances, though, a gateway may be regarded as an endpoint. A gateway always has a network interface card (NIC), so a gateway is also always an endpoint. A gateway usually uses itself as the first seed during a discovery process. Initially, a gateway does not have any information about endpoints. As endpoints login, the gateway builds an endpoint list for its endpoints. The gateway's duties preferably include: listening for endpoint login requests, listening for endpoint update requests, and (its main task) acting as a gateway for method invocations on endpoints.

Figure 2C:
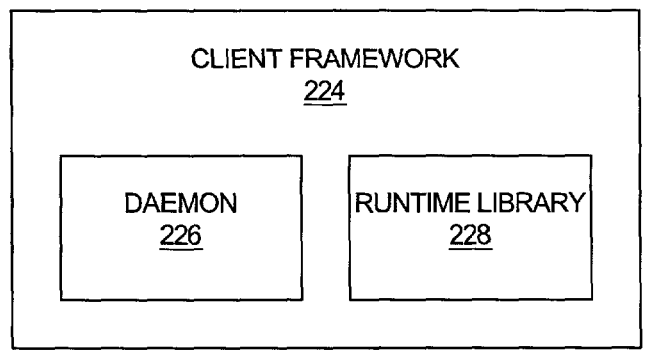
FIG. 2C is a block diagram of the elements that comprise the low cost framework (LCF) client component of the system management framework.

As also discussed above, the endpoint is a machine running the system management framework client component, which is referred to herein as a management agent. The management agent has two main parts as illustrated in FIG. 2C: daemon 226 and application runtime library 228. Daemon 226 is responsible for endpoint login and for spawning application endpoint executables. Once an executable is spawned, daemon 226 has no further interaction with it. Each executable is linked with application runtime library 228, which handles all further communication with the gateway.

Each endpoint is also a computing device. In one preferred embodiment of the invention, most of the endpoints are personal computers, e.g., desktop machines or laptops. In this architecture, the endpoints need not be high powered or complex machines or workstations. An endpoint computer preferably includes a Web browser such as Netscape Navigator or Microsoft Internet Explorer. An endpoint computer thus may be connected to a gateway via the Internet, an intranet, or some other computer network.

Preferably, the client-class framework running on each endpoint is a low-maintenance, low-cost framework that is ready to do management tasks but consumes few machine resources because it is normally in an idle state. Each endpoint may be "dataless" in the sense that system management data is not stored therein before or after a particular system management task is implemented or carried out.

Figure 2D:
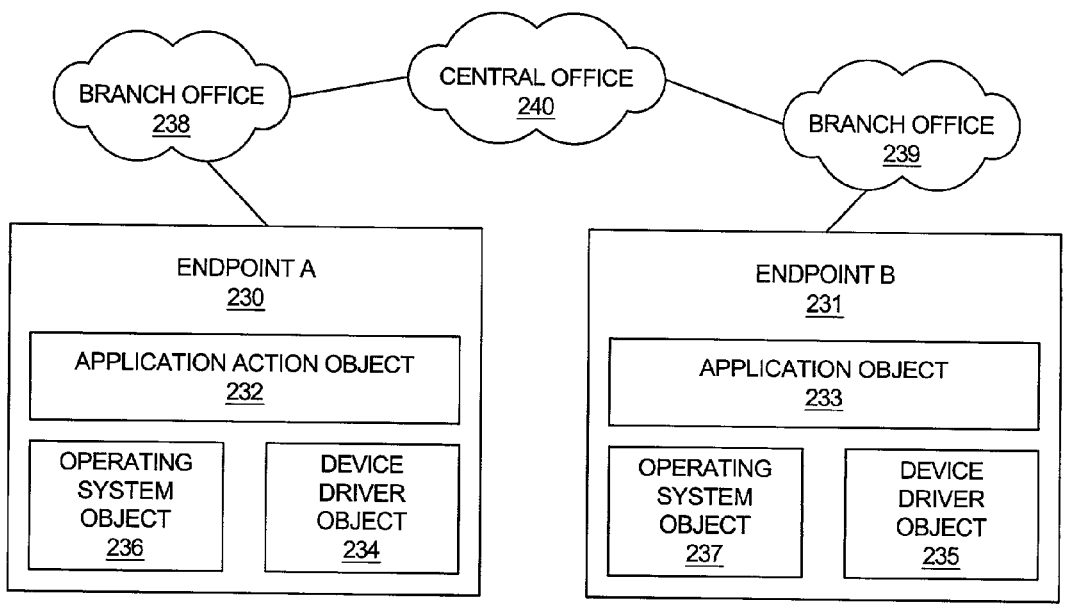
FIG. 2D is a diagram depicting a logical configuration of software objects residing within a hardware network similar to that shown in FIG. 2A.

With reference now to FIG. 2D, a diagram depicts a logical configuration of software objects residing within a hardware network similar to that shown in FIG. 2A. The endpoints in FIG. 2D are similar to the endpoints shown in FIG. 2B. Object-oriented software, similar to the collection of objects shown in FIG. 1, executes on the endpoints. Endpoints 230 and 231 support application action object 232 and application object 233, device driver objects 234-235, and operating system objects 236-237 that communicate across a network with other objects and hardware resources.

Resources can be grouped together by an enterprise into managed regions representing meaningful groups. Overlaid on these regions are domains that divide resources into groups of resources that are managed by gateways. The gateway machines provide access to the resources and also perform routine operations on the resources, such as polling. FIG. 2D shows that endpoints and objects can be grouped into managed regions that represent branch offices 238 and 239 of an enterprise, and certain resources are controlled by central office 240. Neither a branch office nor a central office is necessarily restricted to a single physical location, but each represents some of the hardware resources of the distributed application framework, such as routers, system management servers, endpoints, gateways, and critical applications, such as corporate management Web servers. Different types of gateways can allow access to different types of resources, although a single gateway can serve as a portal to resources of different types.

Figure 2E:
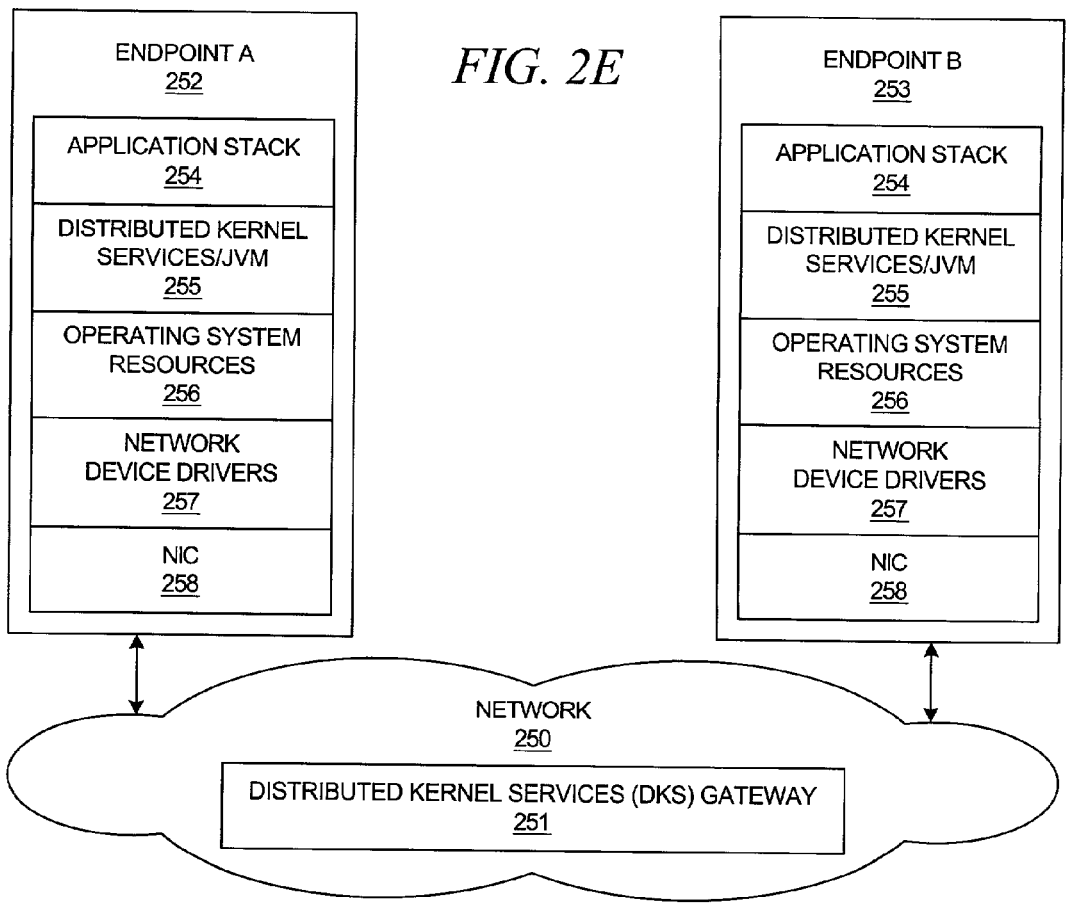
FIG. 2E is a diagram depicting the logical relationships between components within a system management framework that includes two endpoints and a gateway.

With reference now to FIG. 2E, a diagram depicts the logical relationships between components within a system management framework that includes two endpoints and a gateway. FIG. 2E shows more detail of the relationship between components at an endpoint. Network 250 includes gateway 251 and endpoints 252 and 253, which contain similar components, as indicated by the similar reference numerals used in the figure. An endpoint may support a set of applications 254 that use services provided by the distributed kernel services 255, which may rely upon a set of platform-specific operating system resources 256. Operating system resources may include TCP/IP-type resources, SNMP-type resources, and other types of resources. For example, a subset of TCP/IP-type resources may be a line printer (LPR) resource that allows an endpoint to receive print jobs from other endpoints. Applications 254 may also provide self-defined sets of resources that are accessible to other endpoints. Network device drivers 257 send and receive data through NIC hardware 258 to support communication at the endpoint.

Figure 2F:
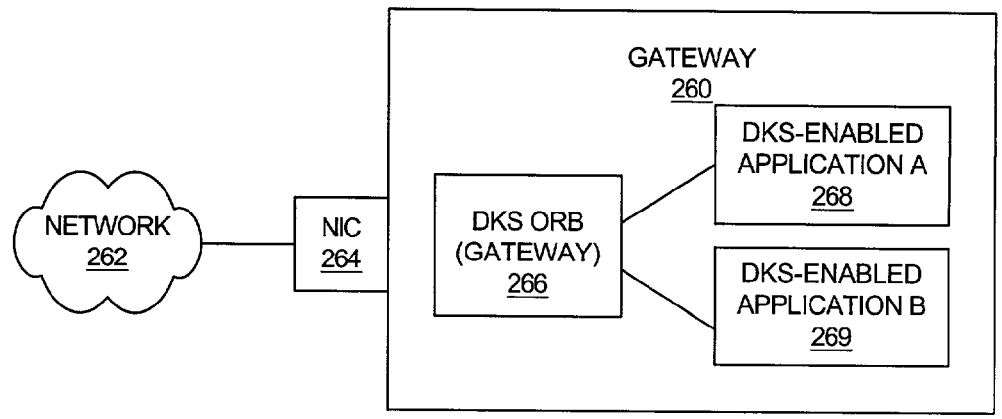
FIG. 2F is a diagram depicting the logical relationships between components within a system management framework that includes a gateway supporting two DKS-enabled applications.

With reference now to FIG. 2F, a diagram depicts the logical relationships between components within a system management framework that includes a gateway supporting two DKS-enabled applications. Gateway 260 communicates with network 262 through NIC 264. Gateway 260 contains ORB 266 that supports DKS-enabled applications 268 and 269. FIG. 2F shows that a gateway can also support applications. In other words, a gateway should not be viewed as merely being a management platform but may also execute other types of applications.

Figure 2G:
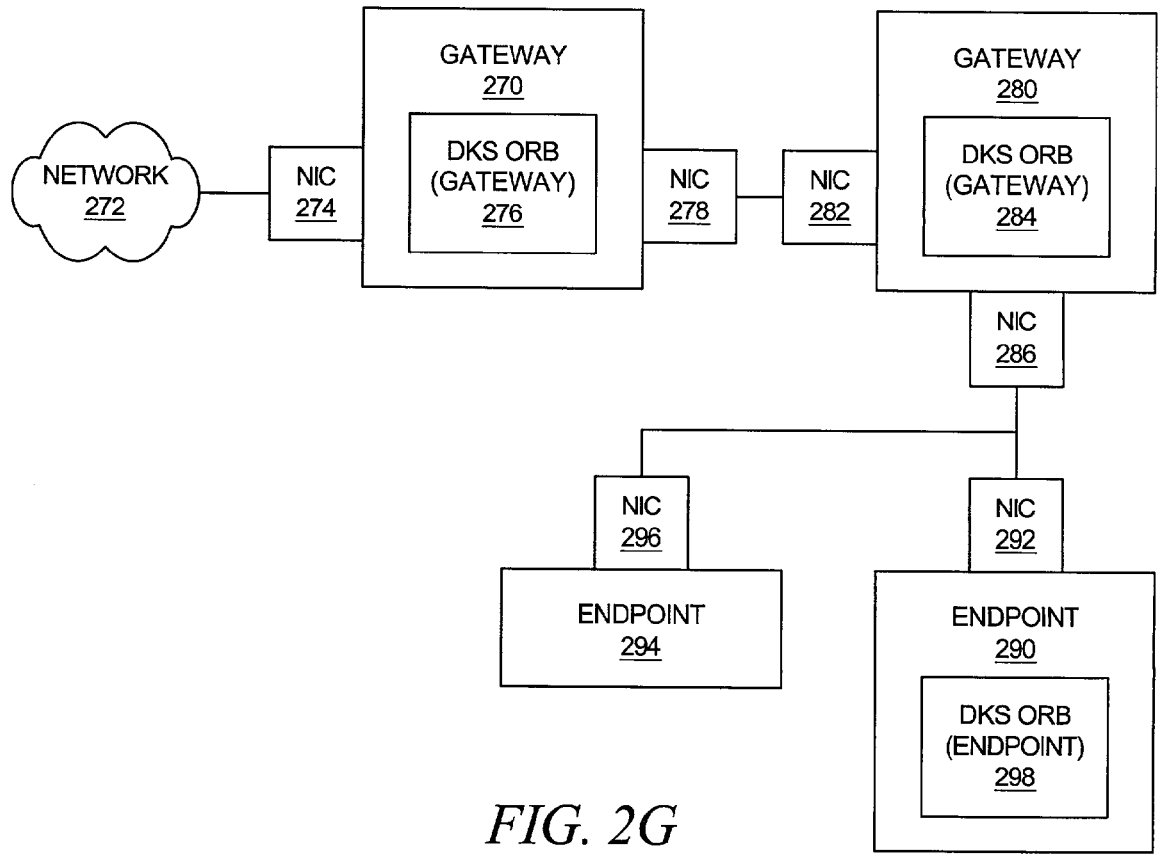
FIG. 2G is a diagram depicting the logical relationships between components within a system management framework that includes two gateways supporting two endpoints.

With reference now to FIG. 2G, a diagram depicts the logical relationships between components within a system management framework that includes two gateways supporting two endpoints. Gateway 270 communicates with network 272 through NIC 274. Gateway 270 contains ORB 276 that may provide a variety of services, as is explained in more detail further below. In this particular example, FIG. 2G shows that a gateway does not necessarily connect with individual endpoints.

Gateway 270 communicates through NIC 278 and network 279 with gateway 280 and its NIC 282. Gateway 280 contains ORB 284 for supporting a set of services. Gateway 280 communicates through NIC 286 and network 287 to endpoint 290 through its NIC 292 and to endpoint 294 through its NIC 296. Endpoint 290 contains ORB 298 while endpoint 294 does not contain an ORB. In this particular example, FIG. 2G also shows that an endpoint does not necessarily contain an ORB. Hence, any use of endpoint 294 as a resource is performed solely through management processes at gateway 280.

FIGS. 2F and 2G also depict the importance of gateways in determining routes/data paths within a highly distributed system for addressing resources within the system and for performing the actual routing of requests for resources. The importance of representing NICs as objects for an object-oriented routing system is described in more detail further below.

As noted previously, the present invention is directed to a methodology for managing a distributed computing environment. A resource is a portion of a computer system's physical units, a portion of a computer system's logical units, or a portion of the computer system's functionality that is identifiable or addressable in some manner to other physical or logical units within the system.

Figure 3:
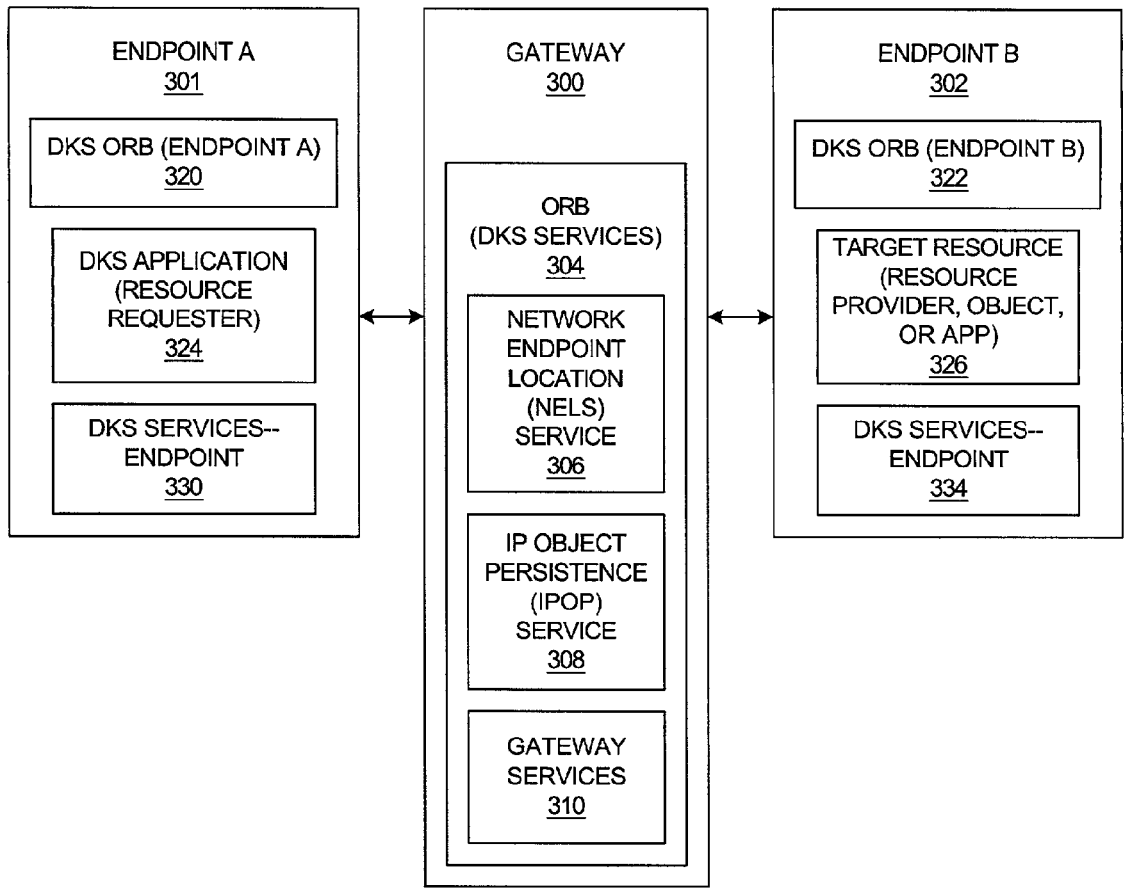
FIG. 3 is a block diagram depicting components within the system management framework that provide resource leasing management functionality within a distributed computing environment such as that shown in FIGS. 2D-2E.

With reference now to FIG. 3, a block diagram depicts components within the system management framework within a distributed computing environment such as that shown in FIGS. 2D-2E. A network contains gateway 300 and endpoints 301 and 302. Gateway 302 runs ORB 304. In general, an ORB can support different services that are configured and run in conjunction with an ORB. In this case, distributed kernel services (DKS) include Network Endpoint Location Service (NELS) 306, IP Object Persistence (IPOP) service 308, and gateway service 310.

The gateway service processes action objects, which are explained in more detail below, and directly communicates with endpoints or agents to perform management operations. The gateway receives events from resources and passes the events to interested parties within the distributed system. The NELS works in combination with action objects and determines which gateway to use to reach a particular resource. A gateway is determined by using the discovery service of the appropriate topology driver, and the gateway location may change due to load balancing or failure of primary gateways.

Other resource level services may include an SNMP (Simple Network Management Protocol) service that provides protocol stacks, polling service, and trap receiver and filtering functions. The SNMP service can be used directly by certain components and applications when higher performance is required or the location independence provided by the gateways and action objects is not desired. A metadata service can also be provided to distribute information concerning the structure of SNMP agents.

The representation of resources within DKS allows for the dynamic management and use of those resources by applications. DKS does not impose any particular representation, but it does provide an object-oriented structure for applications to model resources. The use of object technology allows models to present a unified appearance to management applications and hide the differences among the underlying physical or logical resources. Logical and physical resources can be modeled as separate objects and related to each other using relationship attributes.

By using objects, for example, a system may implement an abstract concept of a router and then use this abstraction within a range of different router hardware. The common portions can be placed into an abstract router class while modeling the important differences in subclasses, including representing a complex system with multiple objects. With an abstracted and encapsulated function, the management applications do not have to handle many details for each managed resource. A router usually has many critical parts, including a routing subsystem, memory buffers, control components, interfaces, and multiple layers of communication protocols. Using multiple objects has the burden of creating multiple object identifiers (OIDs) because each object instance has its own OID. However, a first order object can represent the entire resource and contain references to all of the constituent parts.

Each endpoint may support an object request broker, such as ORBs 320 and 322, for assisting in remote object-oriented operations within the DKS environment. Endpoint 301 contains DKS-enabled application 324 that utilizes object-oriented resources found within the distributed computing environment. Endpoint 302 contains target resource provider object or application 326 that services the requests from DKS-enabled application 324. A set of DKS services 330 and 334 support each particular endpoint.

Applications require some type of insulation from the specifics of the operations of gateways. In the DKS environment, applications create action objects that encapsulate commands which are sent to gateways, and the applications wait for the return of the action object. Action objects contain all of the information necessary to run a command on a resource. The application does not need to know the specific protocol that is used to communicate with the resource. The application is unaware of the location of the gateway because it issues an action object into the system, and the action object itself locates and moves to the correct gateway. The location independence allows the NELS to balance the load between gateways independently of the applications and also allows the gateways to handle resources or endpoints that move or need to be serviced by another gateway.

The communication between a gateway and an action object is asynchronous, and the action objects provide error handling and recovery. If one gateway goes down or becomes overloaded, another gateway is located for executing the action object, and communication is established again with the application from the new gateway. Once the controlling gateway of the selected endpoint has been identified, the action object will transport itself there for further processing of the command or data contained in the action object. If it is within the same ORB, it is a direct transport. If it is within another ORB, then the transport can be accomplished with a "Moveto" command or as a parameter on a method call.

Queuing the action object on the gateway results in a controlled process for the sending and receiving of data from the IP devices. As a general rule, the queued action objects are executed in the order that they arrive at the gateway. The action object may create child action objects if the collection of endpoints contains more than a single ORB ID or gateway ID. The parent action object is responsible for coordinating the completion status of any of its children. The creation of child action objects is transparent to the calling application. A gateway processes incoming action objects, assigns a priority, and performs additional security challenges to prevent rogue action object attacks. The action object is delivered to the gateway that must convert the information in the action object to a form suitable for the agent. The gateway manages multiple concurrent action objects targeted at one or more agents, returning the results of the operation to the calling application as appropriate.

In the preferred embodiment, potentially leasable target resources are Internet protocol (IP) commands, e.g. pings, and Simple Network Management Protocol (SNMP) commands that can be executed against endpoints in a managed region. Referring again to FIGS. 2F and 2G, each NIC at a gateway or an endpoint may be used to address an action object. Each NIC is represented as an object within the IPOP database, which is described in more detail further below.

The Action Object IP (AOIP) Class is a subclass of the Action Object Class. An AOIP object is the primary vehicle that establishes a connection between an application and a designated IP endpoint using a gateway or stand-alone service. In addition, the Action Object SNMP (AOSnmp) Class is also a subclass of the Action Object Class. An AOSnmp object is the primary vehicle that establishes a connection between an application and a designated SNMP endpoint via a gateway or the gateway service. However, the present invention is primarily concerned with IP endpoints.

The AOIP class should include the following: a constructor to initialize itself; an interface to the NELS; a mechanism by which the action object can use the ORB to transport itself to the selected gateway; a security check verification of access rights to endpoints; a container for either data or commands to be executed at the gateway; a mechanism by which to pass commands or classes to the appropriate gateway or endpoint for completion; and public methods to facilitate the communication between objects.

The instantiation of an AOIP object creates a logical circuit between an application and the targeted gateway or endpoint. This circuit is persistent until command completion through normal operation or until an exception is thrown. When created, the AOIP object instantiates itself as an object and initializes any internal variables required. An AOIP may be capable of running a command from inception or waiting for a future command. A program that creates an AOIP object must supply the following elements: address of endpoints; function to be performed on the endpoint; and data arguments specific to the command to be run. A small part of the action object must contain the return end path for the object. This may identify how to communicate with the action object in case of a breakdown in normal network communications. An action object can contain either a class or object containing program information or data to be delivered eventually to an endpoint or a set of commands to be performed at the appropriate gateway. Action objects IP return back a result for each address endpoint targeted.

Using commands such as "Ping", "Trace Route", "Wake-On LAN", and "Discovery", the AOIP object performs the following services: facilitates the accumulation of metrics for the user connections; assists in the description of the topology of a connection; performs Wake-On LAN tasks using helper functions; and discovers active agents in the network environment.

The NELS service finds a route to communicate between the application and the appropriate endpoint. The NELS service converts input to protocol, network address, and gateway location for use by action objects. The NELS service is a thin service that supplies information discovered by the IPOP service. The primary roles of the NELS service are as follows: support the requests of applications for routes; maintain the gateway and endpoint caches that keep the route information; ensure the security of the requests; and perform the requests as efficiently as possible to enhance performance.

For example, an application requires a target endpoint (target resource) to be located. The target is ultimately known within the DKS space using traditional network values, i.e. a specific network address and a specific protocol identifier. An action object is generated on behalf of an application to resolve the network location of an endpoint. The action object asks the NELS service to resolve the network address and define the route to the endpoint in that network.

One of the following is passed to the action object to specify a destination endpoint: an EndpointAddress object; a fully decoded NetworkAddress object; or a string representing the IP address of the IP endpoint. In combination with the action objects, the NELS service determines which gateway to use to reach a particular resource. The appropriate gateway is determined using the discovery service of the appropriate topology driver and may change due to load balancing or failure of primary gateways. An "EndpointAddress" object must consist of a collection of at least one or more unique managed resource IDs. A managed resource ID decouples the protocol selection process from the application and allows the NELS service to have the flexibility to decide the best protocol to reach an endpoint. On return from the NELS service, an "AddressEndpoint" object is returned, which contains enough information to target the best place to communicate with the selected IP endpoints. It should be noted that the address may include protocol-dependent addresses as well as protocol-independent addresses, such as the virtual private network id and the IPOP Object ID. These additional addresses handle the case where duplicate addresses exist in the managed region.

When an action needs to be taken on a set of endpoints, the NELS service determines which endpoints are managed by which gateways. When the appropriate gateways are identified, a single copy of the action object is distributed to each identified gateway. The results from the endpoints are asynchronously merged back to the caller application through the appropriate gateways. Performing the actions asynchronously allows for tracking all results whether the endpoints are connected or disconnected. If the AOIP fails to execute on its target gateway, NELS is consulted to identify an alternative path for the command. If an alternate path is found, the action object IP is transported to that gateway and executed. It may be assumed that the entire set of commands within one action object IP must fail before this recovery procedure is invoked.

Figure 4:
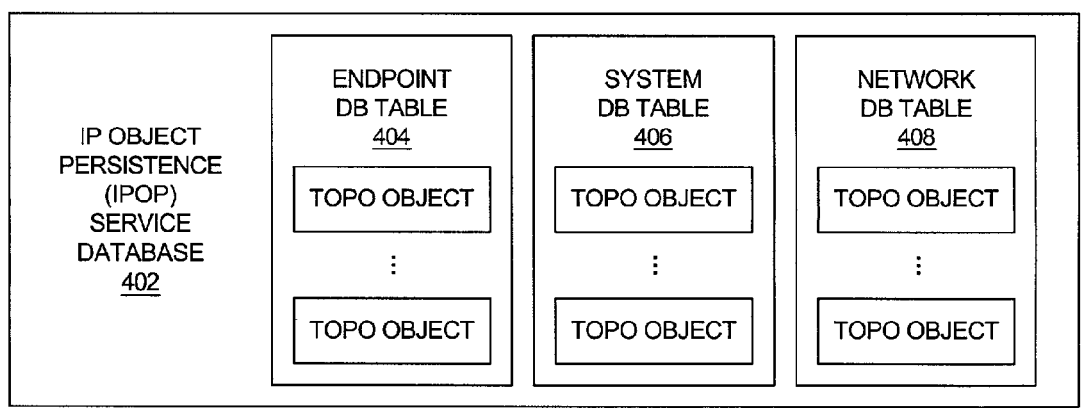
FIG. 4 is a block diagram showing data stored by a the IPOP (IP Object Persistence) service.

With reference now to FIG. 4, a block diagram shows the manner in which data is stored by the IPOP (IP Object Persistence) service. IPOP service database 402 contains endpoint database table 404, system database table 406, and network database table 408. Each table contains a set of topological objects (TopoObjects) for facilitating the leasing of resources at IP endpoints and the execution of action objects. Information within IPOP service database 402 allows applications to generate action objects for resources previously identified as IP objects through a discovery process across the distributed computing environment. FIG. 4 merely shows that the TopoObjects may be separated into a variety of categories that facilitate processing on the various objects. The separation of physical network categories facilitates the efficient querying and storage of these objects while maintaining the physical network relationships in order to produce a graphical user interface of the network topology.

Figure 5A:
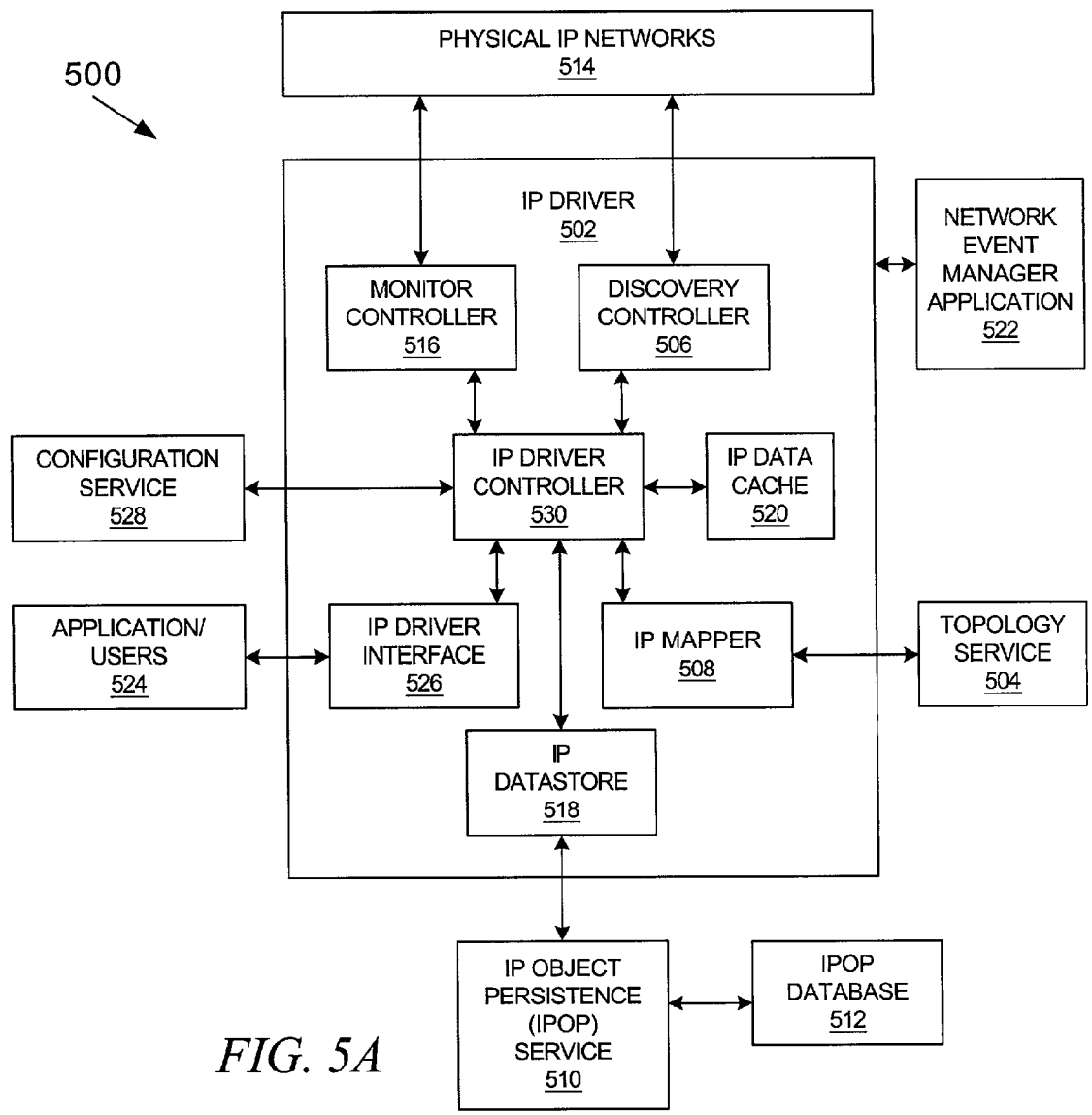
FIG. 5A is a block diagram showing the IPOP service in more detail.

With reference now to FIG. 5A, a block diagram shows the IPOP service in more detail. In the preferred embodiment of the present invention, an IP driver subsystem is implemented as a collection of software components for discovering, i.e. detecting, IP "objects", i.e. IP networks, IP systems, and IP endpoints by using physical network connections. This discovered physical network is used to create topology data that is then provided through other services via topology maps accessible through a graphical user interface (GUI) or for the manipulation of other applications. The IP driver system can also monitor objects for changes in IP topology and update databases with the new topology information. The IPOP service provides services for other applications to access the IP object database.

IP driver subsystem 500 contains a conglomeration of components, including one or more IP drivers 502. Every IP driver manages its own "scope", which is described in more detail further below, and every IP driver is assigned to a topology manager within topology service 504, which can serve more than one IP driver. Topology service 504 stores topology information obtained from discovery controller 506. The information stored within the topology service may include graphs, arcs, and the relationships between nodes determined by IP mapper 508. Users can be provided with a GUI to navigate the topology, which can be stored within a database within the topology service.

IPOP service 510 provides a persistent repository 512 for discovered IP objects; persistent repository 512 contains attributes of IP objects without presentation information. Discovery controller 506 detects IP objects in Physical IP networks 514, and monitor controller 516 monitors IP objects. A persistent repository, such as IPOP database 512, is updated to contain information about the discovered and monitored IP objects. IP driver may use temporary IP data store component 518 and IP data cache component 520 as necessary for caching IP objects or storing IP objects in persistent repository 512, respectively. As discovery controller 506 and monitor controller 516 perform detection and monitoring functions, events can be written to network event manager application 522 to alert network administrators of certain occurrences within the network, such as the discovery of duplicate IP addresses or invalid network masks.

External applications/users 524 can be other users, such as network administrators at management consoles, or applications that use IP driver GUI interface 526 to configure IP driver 502, manage/unmanage IP objects, and manipulate objects in persistent repository 512. Configuration service 528 provides configuration information to IP driver 502. IP driver controller 530 serves as central control of all other IP driver components.

Referring back to FIG. 2G, a network discovery engine is a distributed collection of IP drivers that are used to ensure that operations on IP objects by gateways 260, 270, and 280 can scale to a large installation and provide fault-tolerant operation with dynamic start/stop or reconfiguration of each IP driver. The IPOP service stores and retrieves information about discovered IP objects; to do so, the IPOP service uses a distributed database in order to efficiently service query requests by a gateway to determine routing, identity, or a variety of details about an endpoint. The IPOP service also services queries by the topology service in order to display a physical network or map them to a logical network, which is a subset of a physical network that is defined programmatically or by an administrator. IPOP fault tolerance is also achieved by distribution of IPOP data and the IPOP service among many Endpoint ORBs.

One or more IP drivers can be deployed to provide distribution of IP discovery and promote scalability of IP driver subsystem services in large networks where a single IP driver is not sufficient to discover and monitor all IP objects. Each IP driver performs discovery and monitoring on a collection of IP resources within the driver's "scope". A driver's scope, which is explained in more detail below, is simply the set of IP subnets for which the driver is responsible for discovering and monitoring. Network administrators generally partition their networks into as many scopes as needed to provide distributed discovery and satisfactory performance.

A potential risk exists if the scope of one driver overlaps the scope of another, i.e. if two drivers attempt to discover/monitor the same device. Accurately defining unique and independent scopes may require the development of a scope configuration tool to verify the uniqueness of scope definitions. Routers also pose a potential problem in that while the networks serviced by the routers will be in different scopes, a convention needs to be established to specify to which network the router "belongs", thereby limiting the router itself to the scope of a single driver.

Some ISPs may have to manage private networks whose addresses may not be unique across the installation, like 10.0.0.0 network. In order to manage private networks properly, first, the IP driver has to be installed inside the internal networks in order to be able to discover and manage the networks. Second, since the discovered IP addresses may not be unique across an entire installation that consists of multiple regions, multiple customers, etc., a private network ID has to be assigned to the private network addresses. In the preferred embodiment, the unique name of a subnet becomes "privateNetworkId\subnetAddress". Those customers that do not have duplicate networks address can just ignore the private network ID; the default private network ID is 0.

If Network Address Translator (NAT) is installed to translate the internal IP addresses to Internet IP addresses, users can install the IP drivers outside of NAT and manage the IP addresses inside the NAT. In this case, an IP driver will see only the translated IP addresses and discover only the IP addresses translated. If not all IP addresses inside the NAT are translated, an IP driver will not able to discover all of them. However, if IP drivers are installed this way, users do not have to configure the private network within the IP driver's scope.

Scope configuration is important to the proper operation of the IP drivers because IP drivers assume that there are no overlaps in the drivers' scopes. Since there should be no overlaps, every IP driver has complete control over the objects within its scope. A particular IP driver does not need to know anything about the other IP drivers because there is no synchronization of information between IP drivers. The configuration service provides the means to allow the DKS components to store and retrieve configuration information for a variety of other services from anywhere in the networks. In particular, the scope configuration will be stored in the configuration services so that IP drivers and other applications can access the information.

The ranges of addresses that a driver will discover and monitor are determined by associating a subnet address with a subnet mask and associating the resulting range of addresses with a subnet priority. An IP driver is a collection of such ranges of addresses, and the subnet priority is used to help decide the system address. A system can belong to two or more subnets, such as is commonly seen with a Gateway. The system address is the address of one of the NICs that is used to make SNMP queries. A user interface can be provided, such as an administrator console, to write scope information into the configuration service. System administrators do not need to provide this information at all, however, as the IP drivers can use default values.

An IP driver gets its scope configuration information from the configuration service, which may be stored using the following format:

scopeID=driverID,anchorname,subnetAddress:subnetMask[:privateNetworkId:privateNetworkName:subnetPriority][, subnetAddress:subnetMask:privateNetworkId:privateNetworkName :subnetPriority]]

Typically, one IP driver manages only one scope. Hence, the "scopeID" and "driverID" would be the same. However, the configuration can provide for more than one scope managed by the same driver. "Anchorname" is the name in the name space in which the topology service will put the IP driver's network objects.

A scope does not have to include an actual subnet configured in the network. Instead, users/administrators can group subnets into a single, logical scope by applying a bigger subnet mask to the network address. For example, if a system has subnet "147.0.0.0" with mask of "255.255.0.0"and subnet "147.1.0.0" with a subnet mask of "255.255.0.0", the subnets can be grouped into a single scope by applying a mask of "255.254.0.0". Assume that the following table is the scope of IP Driver 2. The scope configuration for IP Driver 2 from the configuration service would be: 2=2,ip,147.0.0.0:255.254.0.0,146.100.0.0: 255.255.0.0, 69.0.0.0:255.0.0.0.

| Subnet address | Subnet mask |
| --- | --- |
| 147.0.0.0 | 255.255.0.0 |
| 147.1.0.0 | 255.255.0.0 |
| 146.100.0.0 | 255.255.0.0 |
| 69.0.0.0 | 255.0.0.0 |

In general, an IP system is associated with a single IP address, and the "scoping" process is a straightforward association of a driver's ID with the system's IP address.

Routers and multi-homed systems, however, complicate the discovery and monitoring process because these devices may contain interfaces that are associated with different subnets. If all subnets of routers and multi-homed systems are in the scope of the same driver, the IP driver will manage the whole system. However, if the subnets of routers and multi-homed systems are across the scopes of different drivers, a convention is needed to determine a dominant interface: the IP driver that manages the dominant interface will manage the router object so that the router is not being detected and monitored by multiple drivers; each interface is still managed by the IP driver determined by its scope; the IP address of the dominant interface will be assigned as the system address of the router or multi-homed system; and the smallest (lowest) IP address of any interface on the router will determine which driver includes the router object within its scope.

Users can customize the configuration by using the subnet priority in the scope configuration. The subnet priority will be used to determinate the dominant interface before using the lowest IP address. If the subnet priorities are the same, the lowest IP address is then used. Since the default subnet priority would be "0", then the lowest IP address would be used by default.

Figure 5B:
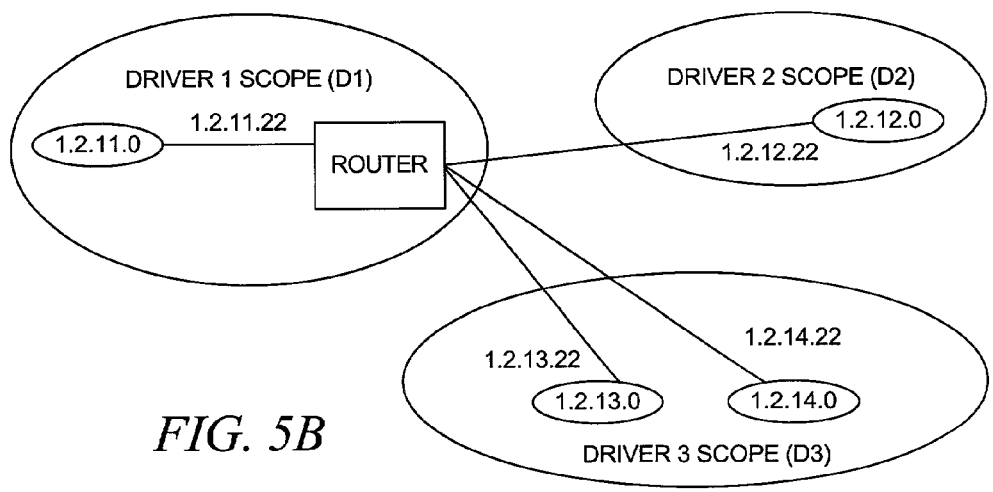
FIG. 5B is a network diagram depicting a set of routers that undergo a scoping process.

With reference now to FIG. 5B, a network diagram depicts a network with a router that undergoes a scoping process. IP driver D1 will include the router in its scope because the subnet associated with that router interface is lower than the other three subnet addresses. However, each driver will still manage those interfaces inside the router in its scope. Drivers D2 and D3 will monitor the devices within their respective subnets, but only driver D1 will store information about the router itself in the IPOP database and the topology service database.

If driver D1's entire subnet is removed from the router, driver D2 will become the new "owner" of the router object because the subnet address associated with driver D2 is now the lowest address on the router. Because there is no synchronization of information between the drivers, the drivers will self-correct over time as they periodically rediscover their resources. When the old driver discovers that it no longer owns the router, it deletes the router's information from the databases. When the new driver discovers the router's lowest subnet address is now within its scope, the new driver takes ownership of the router and updates the various databases with the router's information. If the new driver discovers the change before the old driver has deleted the object, then the router object may be briefly represented twice until the old owner deletes the original representation.

There are two kinds of associations between IP objects. One is "IP endpoint in IP system" and the other is "IP endpoint in IP network". The implementation of associations relies on the fact that an IP endpoint has the object IDs (OIDS) of the IP system and the IP network in which it is located. An IP driver can partition all IP networks, IP Systems, and IP endpoints into different scopes. A network and all its IP endpoints will always be assigned in the same scope. However, a router may be assigned to an IP driver, but some of its interfaces are assigned to different IP drivers. The IP drivers that do not manage the router but manage some of its interfaces will have to create interfaces but not the router object. Since those IP drivers do not have a router object ID to assign to its managed interfaces, they will assign a unique system name instead of object ID in the IP endpoint object to provide a link to the system object in a different driver.

Because of the inter-scope association, when the IP Object Persistence Service (IPOP) is queried to find all the IP endpoints in system, it will have to search not only IP endpoints with the system ID but also IP endpoints with its system name. If a distributed IP Object Persistence Service is implemented, the service has to provide extra information for searching among its distributed instances.

Figure 5C:
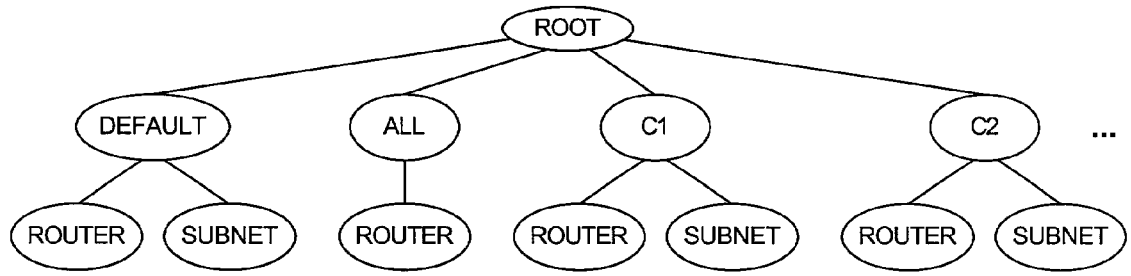
FIG. 5C depicts the IP Object Security Hierarchy.

An IP driver may use a security service to check access to IP objects. In order to handle large number of objects, the security service requires the users to provide a naming hierarchy as the grouping mechanism. FIG. 5C, described below, shows a security naming hierarchy of IP objects. An IP driver has to allow users to provide security down to the object level and to achieve high performance. In order to achieve this goal, the concepts of "anchor" and "unique object name" are introduced. An anchor is a name in the naming space which can be used to plug in IP networks. Users can define, under the anchor, scopes that belong to the same customer or to a region. The anchor is then used by the security service to check if a user has access to the resource under the anchor. If users want a security group defined inside a network, the unique object name is used. A unique object name is in the format of:

IP network—privateNetworkID/binaryNetworkAddress

IP system—privateNetworkID/binaryIPAddress/system

IP endpoint—privateNetworkID/binaryNetworkAddress/ endpoint

For example:

A network "146.84.28.0:255.255.255.0" in privateNetworkID 12 has unique name:

12/1/0/0/1/0/0/1/0/0/1/0/1/0/1/0/0/0/0/0/1/1/1/0/0.

A system "146.84.28.22" in privateNetworkID 12 has unique name:

12/1/0/0/1/0/0/1/0/0/1/0/1/0/1/0/0/0/0/0/1/1/1/0/0/0/0/0/1/0/ 1/1/0/ system.

An endpoint "146.84.28.22" in privateNetworkId 12 has unique name:

12/1/0/0/1/0/0/1/0/0/1/0/1/0/1/0/0/0/0/0/1/1/1/0/0/0/0/0/1/0/ 1/1/0/ endpoint.

By using an IP-address, binary-tree, naming space, one can group all the IP addresses under a subnet in the same naming space that need to be checked by the security service.

For example, one can set up all IP addresses under subnet "146.84.0.0:255.255.0.0" under the naming space 12/1/0/0/1/0/0/1/0/0/1/0/1/0/1/0/0 and set the access rights based on this node name.

With reference now to FIG. 5C, the IP Object Security Hierarchy is depicted. Under the root, there are two fixed security groups. One is "default" and the other is "all". The name of "default" can be configured by within the configuration service. Users are allowed to configure which subnets are under which customer by using the configuration service.

Under the first level security group, there are router groups and subnet groups. Those systems that have only one interface will be placed under the subnets group. Those systems that have more than one interface will be placed under the router group; a multi-home system will be placed under the router group.

Every IP object has a "securityGroup" field to store which security group it is in. The following describes how security groups are assigned.

When a subnet is created and it is not configured for any customers, its securityGroup is "/default/subnet/subnetAddress". When a subnet is created and it is configured in the "customer1" domain, its "securityGroup" value is "/customer1/subnet/subnetAddress".

When an IP endpoint is created and it is not configured for any customers, its "securityGroup" value is "/default/subnet/subnetAddress". The subnet address is the address of the subnet in which the IP endpoint is located. When an IP endpoint is created and it is configured in the "customer1" domain, its "securityGroup" value is "/customer1/subnet/subnetAddress". The subnet address is the address of the subnet in which the IP endpoint is located.

When a single interface IP system is created, it has the same "securityGroup" value that its interface has. When a router or multi-home system is created, the "securityGroup" value depends on whether all of the interfaces in the router or multi-home system are in the same customer group or not. If all of the interfaces of the router or multi-home system are in the same customer group, e.g., "customer1", its "securityGroup" value is "/customer1/router". If the interfaces of the router or multi-home system are in more than one domain, its "securityGroup" value is "/all/router".

These are the default security groups created by an IP driver. After the security group is created for an object, IP driver will not change the security group unless a customer wants to change it.

The IP Monitor Controller, shown in FIG. 5A, is responsible for monitoring the changes of IP topology and objects; as such, it is a type of polling engine, which is discussed in more detail further below. An IP driver stores the last polling times of an IP system in memory but not in the IPOP database. The last polling time is used to calculate when the next polling time will be. Since the last polling times are not stored in the IPOP database, when an IP Driver initializes, it has no knowledge about when the last polling times occurred. If polling is configured to occur at a specific time, an IP driver will do polling at the next specific polling time; otherwise, an IP driver will spread out the polling in the polling interval.

The IP Monitor Controller uses SNMP polls to determine if there have been any configuration changes in an IP system. It also looks for any IP endpoints added to or deleted from an IP system. The IP Monitor Controller also monitors the statuses of IP endpoints in an IP system. In order to reduce network traffic, an IP driver will use SNMP to get the status of all IP endpoints in an IP system in one query unless an SNMP agent is not running on the IP system. Otherwise, an IP driver will use "Ping" instead of SNMP. An IP driver will use "Ping" to get the status of an IP endpoint if it is the only IP endpoint in the system since the response from "Ping" is quicker than SNMP.

Figure 6:
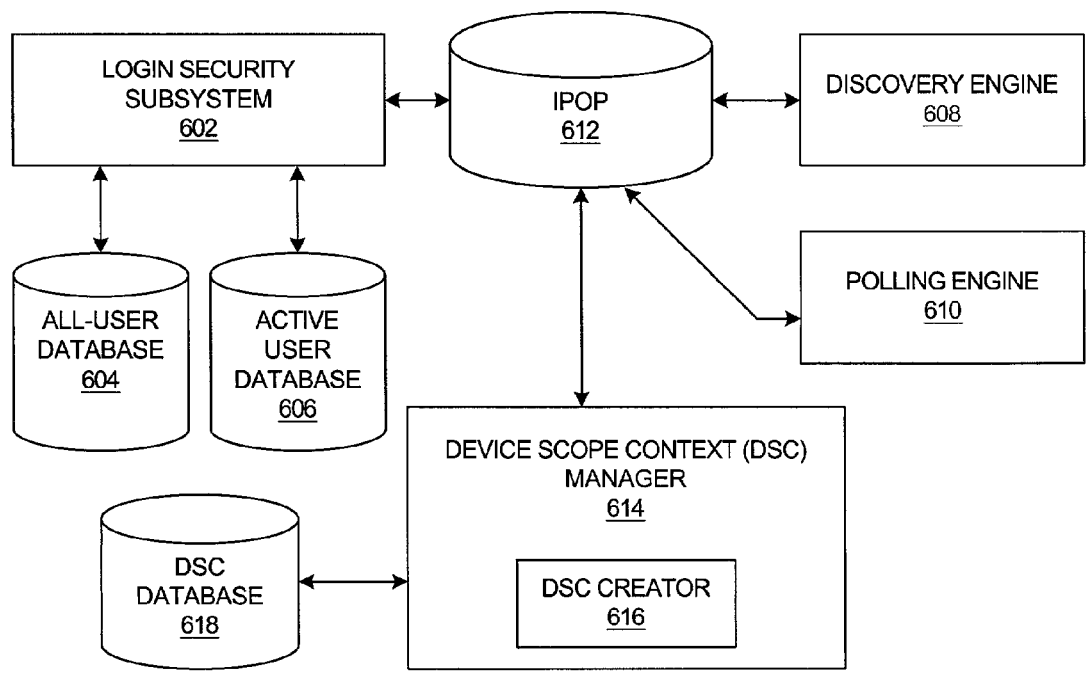
FIG. 6 is a block diagram depicting a set of components that may be used to implement scope-based security access.

With reference now to FIG. 6, a block diagram shows a set of components that may be used to implement scope-based security access in the present invention. Login security subsystem 602 provides a typical authentication service, which may be used to verify the identity of users during a login process. All-user database 604 provides information about all users in the DKS system, and active user database 606 contains information about users that are currently logged into the DKS system.

Discovery engine 608, similar to discovery controller 506 in FIG. 5, detects IP objects within an IP network. Polling engine, similar to monitor controller 516 in FIG. 5, monitors IP objects. A persistent repository, such as IPOP database 612, is updated to contain information about the discovered and monitored IP objects. IPOP also obtains the list of all users from the security subsystem which queries its all-users database 604 when initially creating a DSC (Device Scope Context) object. During subsequent operations to map the location of a user to an ORB, the DSC manager will query the active user database 606.

The DSC manager queries IPOP for all endpoint data during the initial creation of DSCs and any additional information needed, such as decoding an ORB address to an endpoint in IPOP and back to a DSC using the IPOPOid, the ID of a network object as opposed to an address.

An administrator can fill out the security information with respect to access user or endpoint access and designate which users and endpoints will have a DSC. If not configured by the administrator, a default DSC will be used. While not all endpoints will have an associated DSC, IPOP endpoint data 612, login security subsystem 602, and security information 604 are needed in order to create the initial DSCs.

The DSC manager, acting as a DSC data consumer, explained in more detail further below, then listens on this data waiting for new endpoints or users or changes to existing ones. DSC configuration changes are advertised by a responsible network management application, such as a configuration service. Some configuration changes will trigger the creation of more DSCs, while others will cause DSC data in the DSC database to be merely updated.

All DSCs are stored in DSC database 618 by DSC creator 616, which also fetches DSCs upon configuration changes in order to determine whether or not a DSC already exists. The DSC manager primarily fetches DSCs from DSC database 618, but also adds runtime information, such as ORB ID.

Figure 7A:
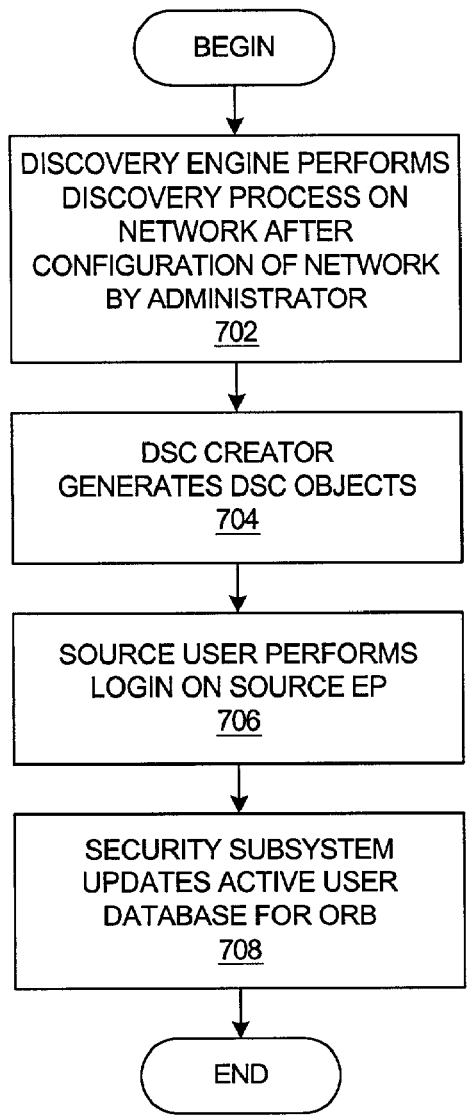
FIG. 7A is a flowchart depicting a portion of an initialization process in which a network management system prepares a security subsystem for user access to network-related objects.

With reference now to FIG. 7A, a flowchart depicts a portion of an initialization process in which a network management system prepares a security subsystem for user access to network-related objects. The process begins with the assumption that a network administrator has already performed configuration processes on the network such that configuration information is properly stored where necessary. The discovery engine performs a discovery process to identify IP objects and stores these in the IPOP persistence storage (step 702).

The DSC creator in the DSC manager generates "initial" DSC objects and stores these within the DSC database (step 704).

A source user then performs a login on a source endpoint (step 706). An application may use a resource, termed a target resource, located somewhere within the distributed system, as described above. Hence, the endpoint on which the target resource is located is termed the "target endpoint". The endpoint on which the application is executing is termed the "source endpoint" to distinguish it from the "target endpoint", and the user of the application is termed the "source user".

As part of the login process, the security subsystem updates the active user database for the ORB on which the application is executing (step 708). The initialization process is then complete.

Figure 7B:
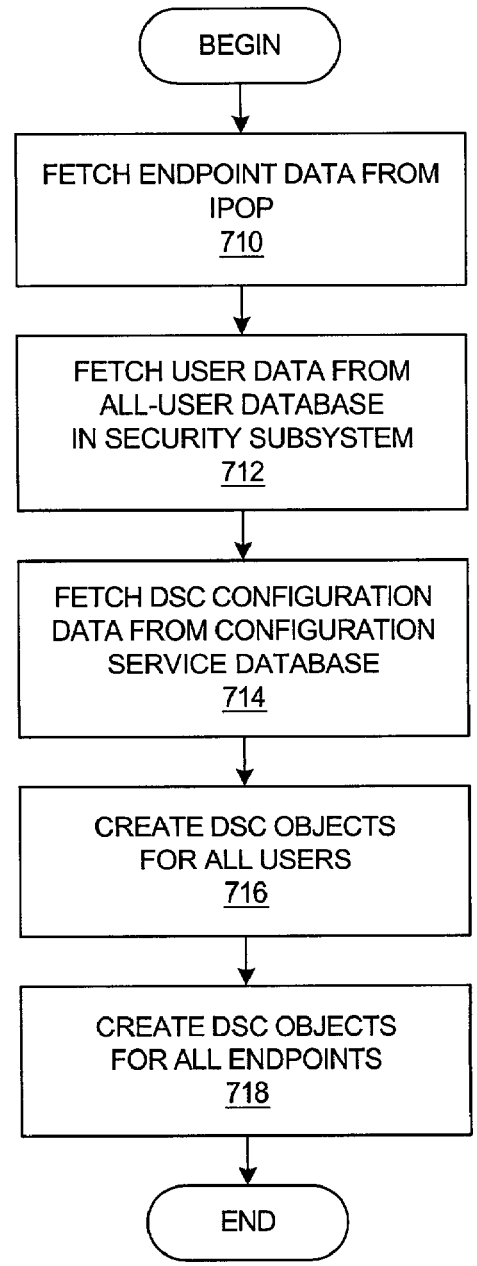
FIG. 7B is a flowchart depicting further detail of the initialization process in which the DSC objects are initially created and stored.

With reference now to FIG. 7B, a flowchart depicts further detail of the initialization process in which the DSC objects are initially created and stored. FIG. 7B provides more detail for step 704 shown in FIG. 7A.

The process shown in FIG. 7B provides an outline for the manner in which the DSC manager sets up associations between users and endpoints and between endpoints and endpoints. These associations are stored as special objects termed "DSC objects". A DSC object is created for all possible combinations of users and endpoints and for all possible combinations of endpoints and endpoints. From one perspective, each DSC object provides guidance on a one-to-one authorization mapping between two points in which a first point (source point) can be a user or an endpoint and a second point (target point) is an endpoint.

FIG. 7B depicts the manner in which the DSC manager initially creates and stores the DSC objects for subsequent use. At some later point in time, a user associated with an application executing on a source endpoint may request some type of network management action at a target endpoint, or a network management application may automatically perform an action at a target endpoint on behalf of a user that has logged into a source endpoint. Prior to completing the necessary network management task, the system must check whether the source user has the proper authorization to perform the task at the target endpoint.

Not all network monitoring and management tasks require that a user initiate the task. Some network management applications will perform tasks automatically without a user being logged onto the system and using the network management application. At some point in time, an application executing on a source endpoint may automatically attempt to perform an action at a target endpoint. Prior to completing the necessary network management task, the system must check whether the source endpoint has the proper authorization to perform the task at the target endpoint in a manner similar to the case of the source user performing an action at a target endpoint.

When the system needs to perform an authorization process, the previously created and stored DSC objects can be used to assist in the authorization process. By storing the DSC objects within a distributed database, a portion of the authorization process has already been completed. Hence, the design of the system has required a tradeoff between time and effort invested during certain system configuration processes and time and effort invested during certain runtime processes. A configuration process may require more time to complete while the DSC objects are created, but runtime authorization processes become much more efficient.

The DSC objects are created and stored within a distributed database during certain configuration processes throughout the system. A new system usually undergoes a significant installation and configuration process. However, during the life of the system, endpoints may be added or deleted, and each addition or deletion generally requires some type of configuration process. Hence, the DSC objects can be created or deleted as needed on an ongoing basis.

The network management framework also provides an additional advantage by storing the DSC objects within a highly distributed database. Because the present invention provides a network management system for an application framework over a highly distributed data processing system, the system avoids centralized bottlenecks that could occur if the authorization processes had to rely upon a centralized security database or application. The first DSC fetch requires relatively more time than might be required with a centralized subsystem. However, once fetched, a DSC is cached until listeners on the configuration data signal that a change has occurred, at which point the DSC cache must be flushed.

The process in FIG. 7B begins with the DSC manager fetching endpoint data from the IPOP database (step 710). The IPOP database was already populated with IP objects during the discovery process, as mentioned in step 702 of FIG. 7A. The DSC manager fetches user data from the all-user database in the security subsystem (step 712). Configuration data is also fetched from the configuration service database or databases (step 714), such as ORB IDs that are subsequently used to fetch the ORB address. A network administration application will also use the configuration service to store information defined by the administrator. The DSC manager then creates DSC objects for each user/endpoint combination (step 716) and for each endpoint/endpoint combination (step 718), and the DSC object creation process is then complete.

With reference now to FIG. 7C, a flowchart depicts further detail of the initial DSC object creation process in which DSC objects are created and stored for an endpoint/user combination. FIG. 7C provides more detail for step 716 in FIG. 7B. The process shown in FIG. 7C is a loop through all users that can be identified within the all-user database. In other words, a set of user accounts or identities have already been created and stored over time. However, all users that have been authorized to use the system do not have the same authorized privileges. The process shown in FIG. 7C is one of the first steps towards storing information that will allow the system to differentiate between users so that it can adaptively monitor the system based partially on the identity of the user for which the system is performing a monitoring task.

The process in FIG. 7C begins by reading scope data for a target endpoint from the IPOP database (step 720). The DSC creator within the DSC manager then reads scope data for a source user from the IPOP database (step 722). A determination is then made as to whether or not the source user is allowed to access the target endpoint (step 724). This determination can be made in the following manner. After the initial DSC is obtained, the source user information is used to make an authorization call to the security subsystem as to whether or not the source user has access to the security group defined in the DSC. It may be assumed that the security system can perform this function efficiently, although the present invention does not depend on autogeneration of security names or security trees. The present invention should not be understood as depending upon any particular implementation of security authorization.

If not, then the process branches to check whether another user identity should be processed. If the source user is allowed to access the target endpoint, then a DSC object is created for the current source user and current target endpoint that are being processed (step 726). The DSC object is then stored within the DSC database (step 728), and a check is made as to whether or not another source user identity requires processing (step 729). If so, then the process loops back to get and process another user, otherwise the process is complete.

With reference now to FIG. 7D, a flowchart depicts further detail of the initial DSC object creation process in which DSC objects are created and stored for an endpoint/endpoint combination. FIG. 7D provides more detail for step 718 in FIG. 7B. The process shown in FIG. 7D is a loop through all endpoints that can be identified within the IPOP database; the IPOP database was already populated with IP objects during the discovery process, as mentioned in step 702 of FIG. 7A. During runtime operations, an application executing on a source endpoint may attempt to perform an action at a target endpoint. However, not all endpoints within the system have access to requesting actions at all other endpoints within the system. The network management system needs to attempt to determine whether or not a source endpoint is authorized to request an action from a target endpoint. The process shown in FIG. 7D is one of the first steps towards storing information that will allow the system to differentiate between endpoints so that it can monitor the system based partially on the identity of the source endpoint for which the system is performing a monitoring task.

The process in FIG. 7D begins by reading scope data for a target endpoint from the IPOP database (step 730). The DSC creator within the DSC manager then reads scope data for a source endpoint from the IPOP database (step 732). A determination is then made as to whether or not the source endpoint is allowed to access the target endpoint (step 734) based on the scope defined in the DSC. For example, a simple scope of X.Y.Z.* will allow an address of X.Y.Z.Q access. If not, then the process branches to check whether another source endpoint should be processed. If the source endpoint is allowed to access the target endpoint, then a DSC object is created for the source endpoint and target endpoint that are currently being processed (step 736). The DSC object is then stored within the DSC database (step 738), and a check is made as to whether or not another source endpoint requires processing (step 739). If so, then the process loops back to get and process another endpoint, otherwise the process is complete.

The components and subsystems described above with respect to FIGS. 6-7D are used to restrict administrative user access to various operations and functionality within the network management framework. The following description of FIGS. 8A-14B describe particular operations and functionality that may be available to administrative users within the network management framework. In particular, FIGS. 8A-14B show various ways in which scopes and anchors are used to perform certain tasks within a single network management framework that is being used to manage a multi-customer environment. More specifically, FIGS. 8A-9B depict a manner in which an administrative user may view the topology of a set of network-related objects that are being managed by the network management framework, whereas FIGS. 10A-14B depict a process for configuring information within the network management framework so that it may manage the networks of multiple customers.

As described above, an IP driver subsystem is implemented as a collection of software components for discovering, i.e. detecting, network "objects", such as IP networks, IP systems, and IP endpoints by using physical network connections. The collected data is then provided through other services via topology maps accessible through a GUI or for the manipulation of other applications. The IP driver system can also monitor objects for changes in IP topology and update databases with the new topology information. The IPOP service provides services for other applications to access the IP object database.

Referring again to FIG. 5A, IP driver subsystem 500 contains a conglomeration of components, including one or more IP drivers 502. Every IP driver manages its own "scope", and every IP driver is assigned to a topology manager within topology service 504, which stores topology information obtained from discovery controller 506. The information stored within the topology service may include graphs, arcs, and the relationships between nodes determined by IP mapper 508. Users can be provided with a GUI to navigate the topology, which can be stored within a database within the topology service.

The topology service provides a framework for DKS-enabled applications to manage topology data. In a manner similar to the IPOP service, the topology service is actually a cluster of topology servers distributed throughout the network. All of the functions of the topology service are replicated in each topology server. Therefore, a client can attach to any server instance and perform the same tasks and access the same objects. Each topology-related database is accessible from more than one topology server, which enables the topology service to recover from a server crash and provide a way to balance the load on the service.

Topology clients create an instance of a TopoClientService class. As part of creating the TopoClientService instance, the class connects to one of the topology servers. The topology server assumes the burden of consolidating all of the topology information distributed over the different topology servers into a single combined view. The topology service tracks changes in the objects of interest for each client and notifies a client if any of the objects change.

The topology service may have a server-cluster design for maximizing availability. As long as there is at least one instance of the topology server running, then clients have access to topology objects and services. The topology service design allows for servers to occasionally fail. Each server is aware of the state of all the other server instances. If one instance fails, the other servers know immediately and automatically begin to rebuild state information that was lost by the failed server. A client's TopoClientService instance also knows of the failure of the server to which it is connected and re-connects to a different server. The objects residing at a failed topology server are migrated to the other topology servers when the drivers owning those objects have re-located.

The topology service is scalable, which is important so that the service may be the central place for all network topology objects for all of the different DKS-related applications in order to provide efficient service for millions of objects. As the number of clients, drivers, and objects increase, an administrator can create more instances of topology servers, thereby balancing the workload. Using the server cluster approach, any growth in the number of clients, drivers, and objects is accommodated by simply adding more servers. The existing servers detect the additional instances and begin to move clients and drivers over to the new instances. The automated load-balancing is achieved because the clients and objects are not dependent on any one server instance.

In order to provide a service for an entire enterprise, all of the enterprise's objects generally do not reside in the same database. There may be many reasons that make it undesirable to require that all topology objects be stored in the same database instance. For example, a database simply may not be reachable across an international boundary, or the volume of information going into the database may exceed a single database's capacity. Therefore, the topology objects may span databases, and there may be relationships between objects in different databases. However, it may be assumed that all topology objects in a domain reside in the same database. For example, all IP objects for a single enterprise do not necessarily reside in the same database as the enterprise's IP space may be split into many domains, e.g., a southwest IP domain and a northeast IP domain, but each domain may reside in different databases and still have relations between their objects. Hence, it is possible to have two objects related to each other even though they are in different databases. Since the name of the domain is part of the id of the object, each object can be uniquely identified within the entire topology service.

When an application is installed and configured to use the DKS services, the application provides some information to the topology service about the different types of TopoObjects it will be creating. This class information closely resembles the network entities that a driver will be managing. For example, an IP application works with Network, System, and Endpoint resource types, as described previously with respect to FIG. 4. Giving TopoObjects a resource type enables client applications to identify, group, and query the databases based on domain-specific types. Each resource type may have many different types of relations that the driver may create, and the most common type may be the containment relation, which shows the containment hierarchy of a domain. Each relation type has a corresponding ViewData object, which provides information that an administrative console needs to create a view of the TopoObjects. For example, the ViewData object may contain members like BackgroundColor and LayoutType that are used to construct a graphical display of the object. Relations can be created between any two TopoObjects. The TopoObjects can be owned by the same driver, different drivers in the domain, or even drivers in different domains.

Figure 8A:
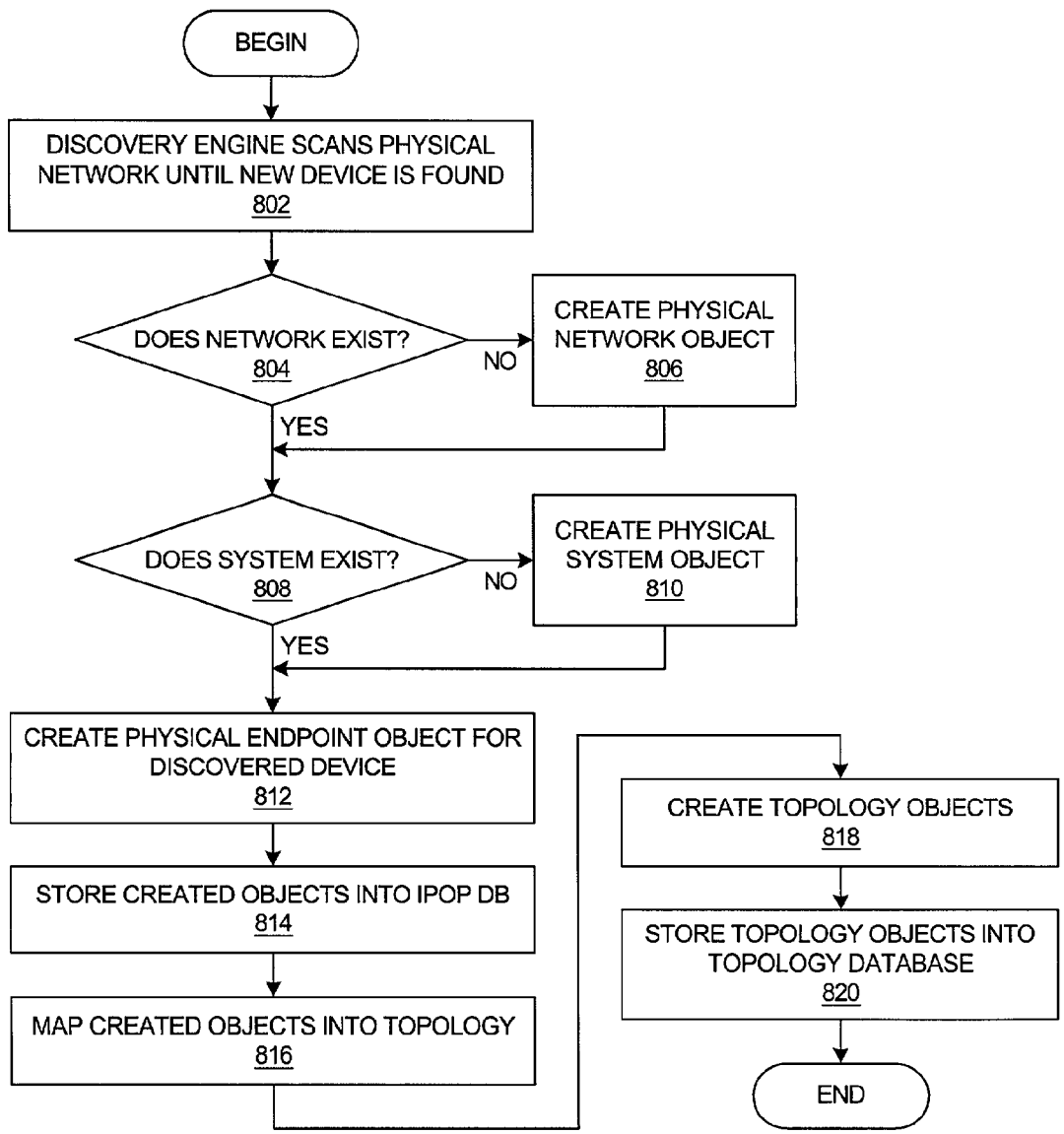
FIG. 8A is a flowchart depicting a process for creating topology data.

With reference now to FIG. 8A, a flowchart depicts a process for creating topology data. The process begins when one or more discovery engines scan physical networks until a new device is found (step 802). A determination is made as to whether or not a network object exists for the network in which the endpoint has been found (step 804). If not, then a network object is created (step 806), otherwise the process continues.

In either case, a determination is then made as to whether or not a system object exists for the system in which the endpoint has been found (step 808). If not, then a system object is created (step 810), otherwise the process continues. In either case, an endpoint object is then created for the discovered device (step 812), and all of the created objects are then stored within the IPOP database (step 814). The created objects are then mapped into the current topology (step 816), and the topology service creates topology objects (step 818) and stores them within the topology database (step 820). The process of discovering a physical network or device and storing appropriate information is then complete.

Figure 8B:
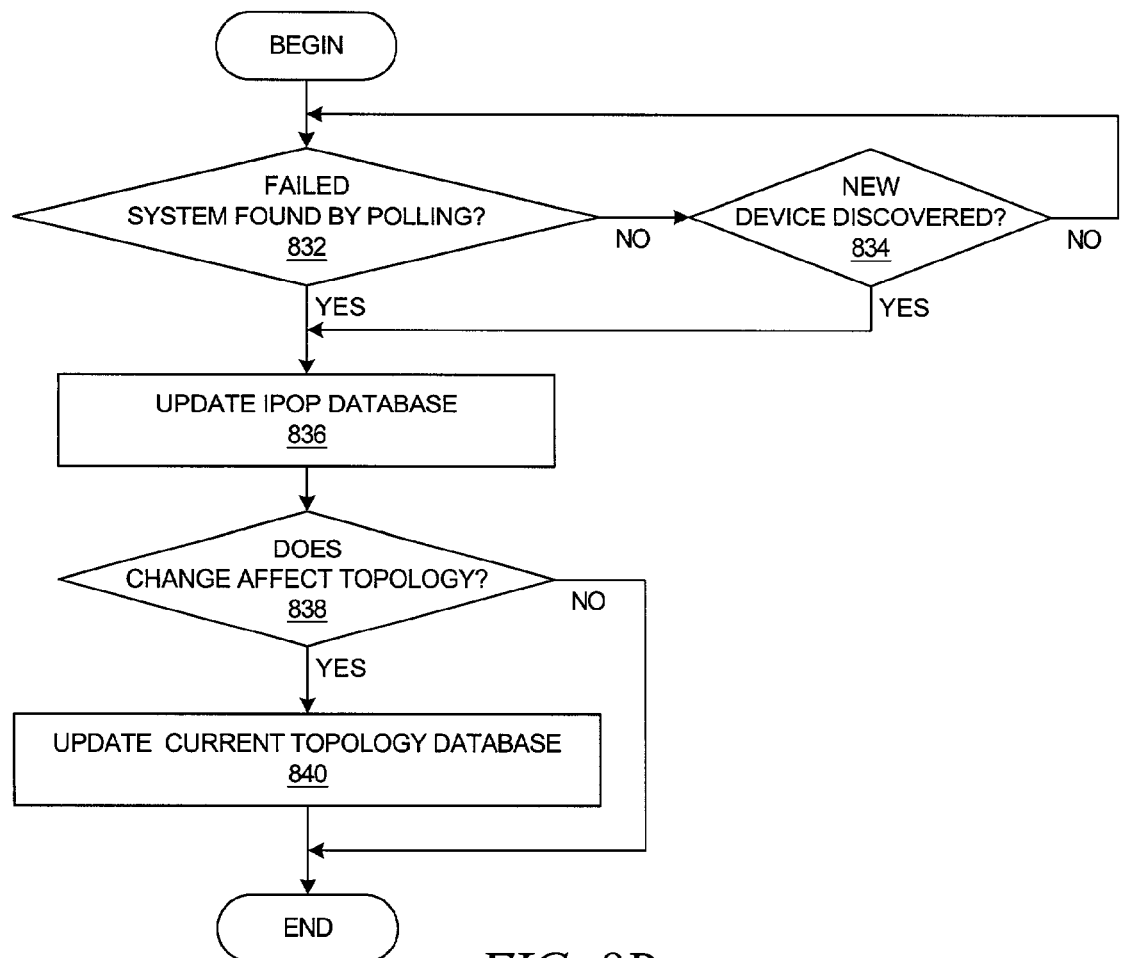
FIG. 8B is a flowchart depicting a process for listening for physical network changes that affect topology objects.

With reference now to FIG. 8B, a flowchart depicts a process for listening for physical network changes that affect topology objects. The process begins with a determination of whether or not one or more polling engines has found a system or device that has failed (step 832). If not, then a determination is made as to whether or not a new device has been discovered (step 834). If not, then the process loops back to continue monitoring the networks.

If either a new device is discovered or a device has failed, then the appropriate changes are made to the objects representing the physical devices that have been affected by updating the IPOP database (step 836). For example, if a new device is found, then appropriate steps are made to create the necessary objects in a manner similar to steps 804-820 in FIG. 8A. A determination is then made as to whether or not the detected change affects the topology (step 838), and if not, then the process is complete. If the topology has been affected, then the topology database is updated as necessary (step 840), and the process of listening for network changes and reflecting those changes within the topology is complete.

Figure 9A:
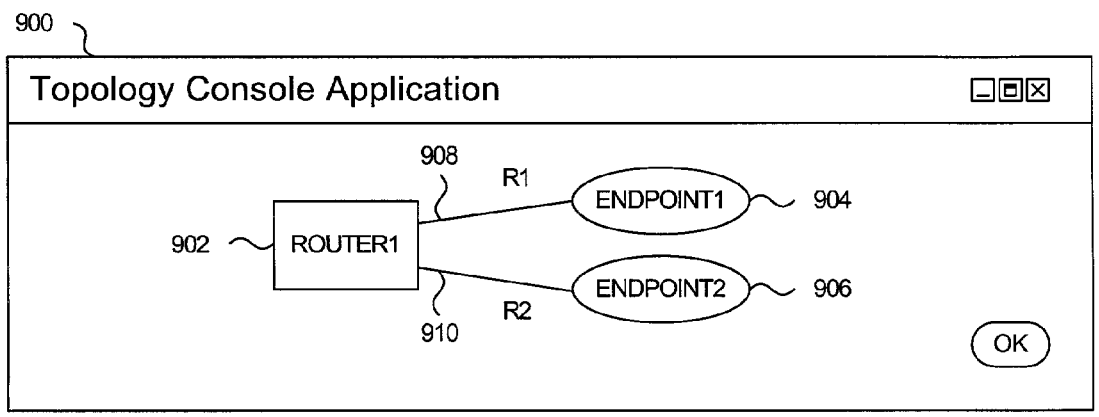
FIG. 9A is a figure depicting a graphical user interface window that may be used by a network or system administrator to view the topology of a network that is being monitored.

With reference now to FIG. 9A, a figure depicts a graphical user interface window that may be used by a network or system administrator to view the topology of a network that is being monitored. Window 900 depicts a simple network showing router device 902, endpoint 904, and endpoint 906. In addition, line 908 shows a relation between endpoint 904 and router 902, and line 910 shows a relation between endpoint 906 and router 902. Each of the icons 902-906 represents a TopoObject that is maintained by the topology service.

Figure 9B:
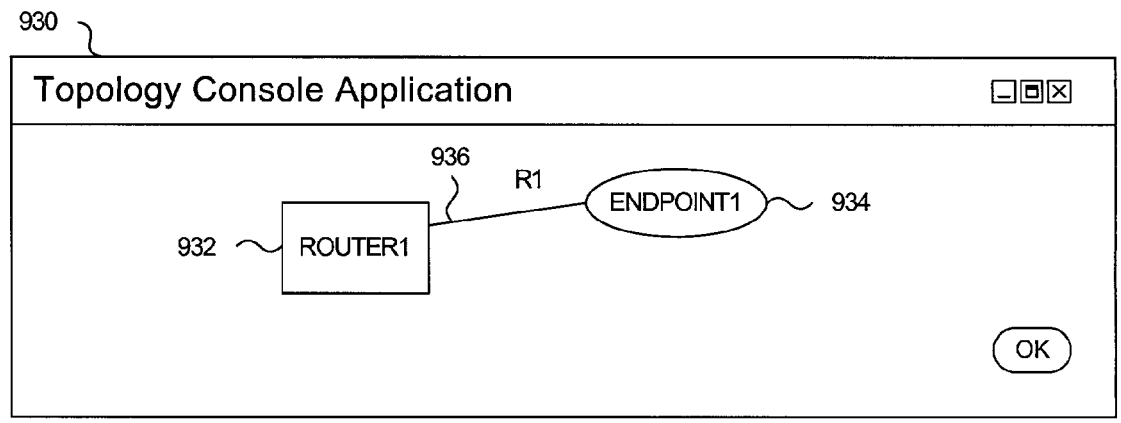
FIG. 9B is a graphical user interface window that shows the topology of a network that has changed.

With reference now to FIG. 9B, a figure depicts a graphical user interface window that shows the topology of a network that has changed. Window 930 in FIG. 9B shows the same network as depicted within window 900 of FIG. 9A except that an endpoint has failed and has been deleted from the current topology. Window 930 depicts a simple network showing router device 932, endpoint 934, and line 936 for the relation between endpoint 934 and router 932.

As noted previously, FIGS. 8A-9B depict one administrative operation that may be performed in conjunction with the present invention, whereas FIGS. 10A-14B depict another administrative operation; these examples are included herein to provide a context in which the network management framework uses IP drivers, scopes, anchors, and other framework components in order to provide a robust network management framework for supporting the management of the networks of multiple customers in an integrated manner.

One particular problem that a robust network management framework for a service provider must confront is the fact that many customers of a service provider may have software-based and/or hardware-based network address translators, or NATs. Each network address within a given domain serviced by a NAT can be assumed to be unique. However, across multiple NATS, each network address within the entire set of network addresses cannot be assumed to be unique. In fact, the potential for duplicate addresses over such a large, highly distributed network is quite high. Even if the service provider is managing only one customer within a particular network management environment, the same problem might also exist because a single customer may operate multiple NATs for multiple networks. This type of problem is illustrated in more detail in FIGS. 10A-10B.

Figure 10A:
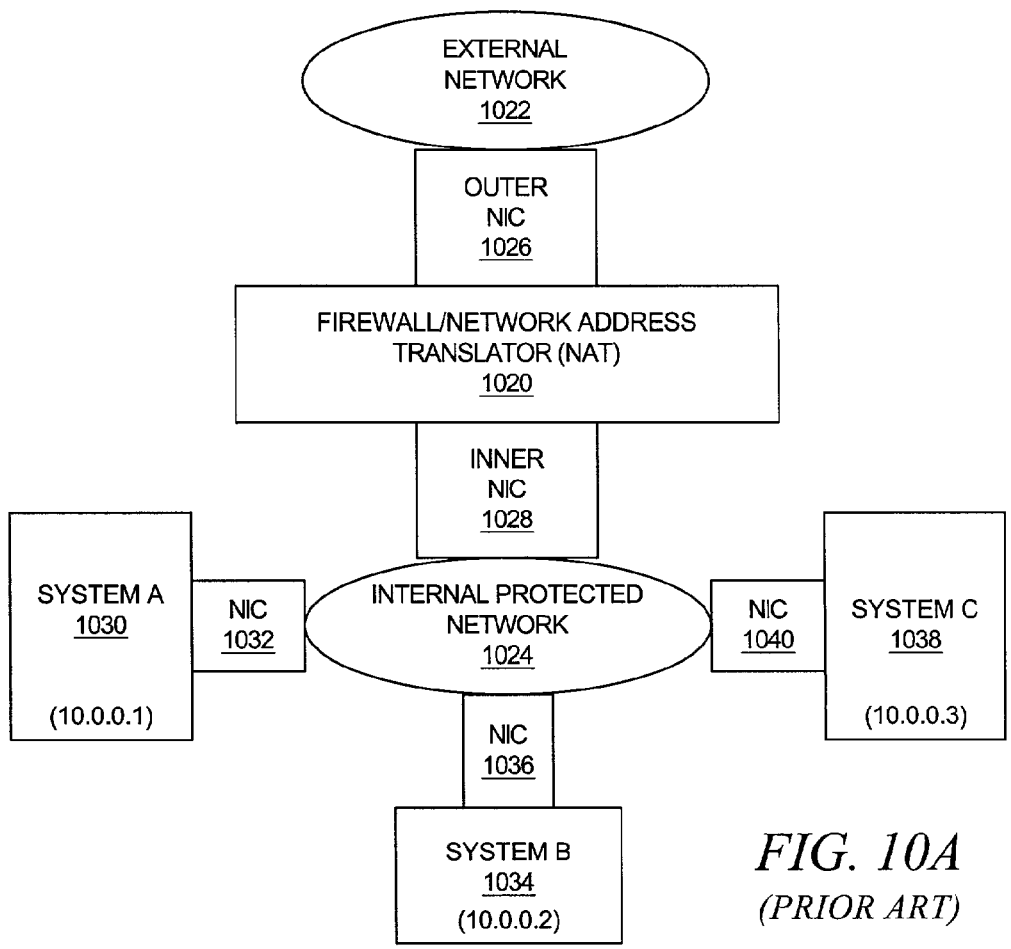
FIG. 10A is a block diagram depicting a known configuration of software and/or hardware network components linking multiple networks.

With reference now to FIG. 10A, a block diagram depicts a known configuration of software and/or hardware network components linking multiple networks. A computer-type device is functioning as firewall/NAT 1020, which is usually some combination of software and hardware, to monitor data traffic from external network 1022 to internal protected network 1024. Firewall 1020 reads data received by network interface card (NIC) 1026 and determines whether the data should be allowed to proceed onto the internal network. If so, then firewall 1020 relays the data through NIC 1028. The firewall can perform similar processes for outbound data to prevent certain types of data traffic from being transmitted, such as HTTP (Hypertext Transport Protocol) Requests to certain domains.

More importantly for this context, the firewall can prevent certain types of network traffic from reaching devices that reside on the internal protected network. For example, the firewall can examine the frame types or other information of the received data packets to stop certain types of information that has been previously determined to be harmful, such as virus probes, broadcast data, pings, etc. As an additional example, entities that are outside of the internal network and lack the proper authorization may attempt to discover, through various methods, the topology of the internal network and the types of resources that are available on the internal network in order to plan electronic attacks on the network. Firewalls can prevent these types of discovery practices.

While firewalls may prevent certain entities from obtaining information from the protected internal network, firewalls may also present a barrier to the operation of legitimate, useful processes. For example, in order to ensure a predetermined level of service, benevolent processes may need to operate on both the external network and the protected internal network; a customer system is more efficiently managed if the management software can dynamically detect and dynamically configure hardware resources as they are installed, rebooted, etc. Various types of discovery processes, status polling, status gathering, etc., may be used to get information about the customer's large, dynamic, distributed processing system. This information is then used to ensure that quality-of-service guarantees to the customer are being fulfilled. However, firewalls might block these system processes, especially discovery processes.

Firewall/NAT 1020 also performs network address translation between addresses on external network 1022 and addresses on internal network 1024. In the example, system 1030 connects to internal network 1024 via NIC 1032; system 1034 connects to internal network 1024 via NIC 1036; and system 1038 connects to internal network 1024 via NIC 1040. Each NIC has its own MAC (Media Access Control layer) address, which is a guaranteed unique hardware address in the NIC that is used to address data packets to and from the system that is using a given NIC. Network Address Translator (NAT) 1020 presents all of the systems on internal network 1024 to external network 1022 with a single, public, IP address. However, systems 1030, 1034, and 1038 have addresses which are unique within internal network 1024. NAT 1020 retrieves the addresses within the data packets flowing between the internal network and the external network, translates the addresses between the two domains, stores the addresses back into the data packets, and forwards the data packets.

The internal network supports a private address space with globally non-unique address, whereas the external network represents a public address space of globally unique addresses. A NAT device is used to manage the connectivity of the private network with the outside world; the NAT device bridges the internal network and the external network and converts addresses between the two address spaces. Within a private network behind a NAT, an enterprise may have its own private address space without concern for integrating the private address space with the global Internet, particularly with the predominant IPv4 address space that is currently in use.

NATs are helpful for certain enterprises that do not require full connectivity for all of its devices. However, NATs present barriers for certain functionality. A NAT must have high performance in order to perform address translation on all data packets that are sent and received by a private network. In addition, a network management framework for a highly distributed system may be forced to coordinate its actions across multiple NAT devices within a single customer or across multiple customers. For example, systems 1030, 1034, and 1038 have addresses which are unique within internal network 1024. However, another internal network within the same enterprise may duplicate the addresses that are used within internal network 1024.

When contending with multiple NATs, the network management framework cannot assume uniqueness among private network addresses. In some prior art systems, it would have been straightforward to use the private network address of a device as a unique key within the network management applications because the private network address has a unique association with a networked device. In a highly distributed system, the network management framework needs to store many data items in an efficient manner yet cannot rely upon a scheme that uses the private network addresses as unique keys for managing those data items.

Future IT solutions may not need to confront the same problems because the Internet is moving towards using a new standard IP protocol known as IP Version 6 (IPv6) that will have a much larger address space. However, a current network management solution must confront legacy issues of maintaining currently installed hardware.

Prior art solutions have generally included dedicated boxes or devices that perform address translation. These solutions tend to be specific modifications to an operating system or kernel, which reduces the benefit of having standardized implementations of software platforms. In other words, some applications may not be compatible with the solution. In addition, such solutions may require installing a dedicated device for each system, which is prohibitive.

Figure 10B:
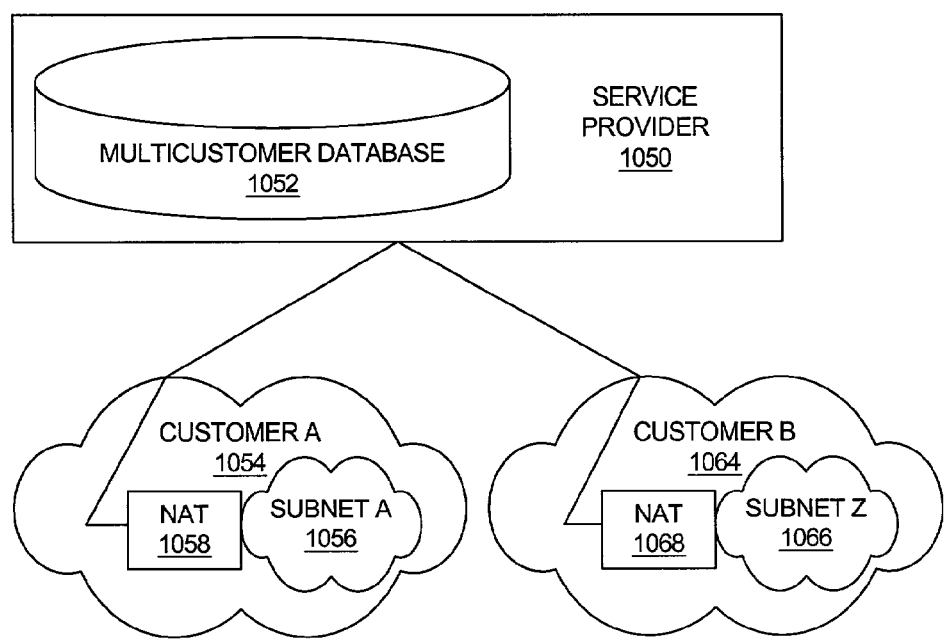
FIG. 10B is a block diagram depicting a service provider connected to two customers that each have subnets that may contain duplicate network addresses.

With reference now to FIG. 10B, a block diagram depicts a service provider connected to two customers that each have subnets that may contain duplicate network addresses. As noted above, multiple internal networks within a highly distributed data processing system may contain duplicate addresses. Service provider 1050 manages networks and applications for multiple customers and stores its data within multi-customer database 1052. Customer 1054 has a network of devices that includes subnet 1056 that connect with the larger network through NAT 1058; customer 1064 has a network of devices that includes subnet 1066 that connect with the larger network through NAT 1068. Duplicate network addresses could appear within subnets 1056 and 1066. In order to provide certain services in a seamless fashion such that both customers can be managed by the service provider as a single logical network, the service provider requires a network management framework that can handle duplicate network addresses.

The network management framework that is described herein can manage multiple networks over which duplicate addresses might appear, e.g., as shown in FIG. 10B, such that the distributed network management framework is operable across multiple NATs. The manner in which the network management is performed is described further below in more detail.

Figures 11A, 13:
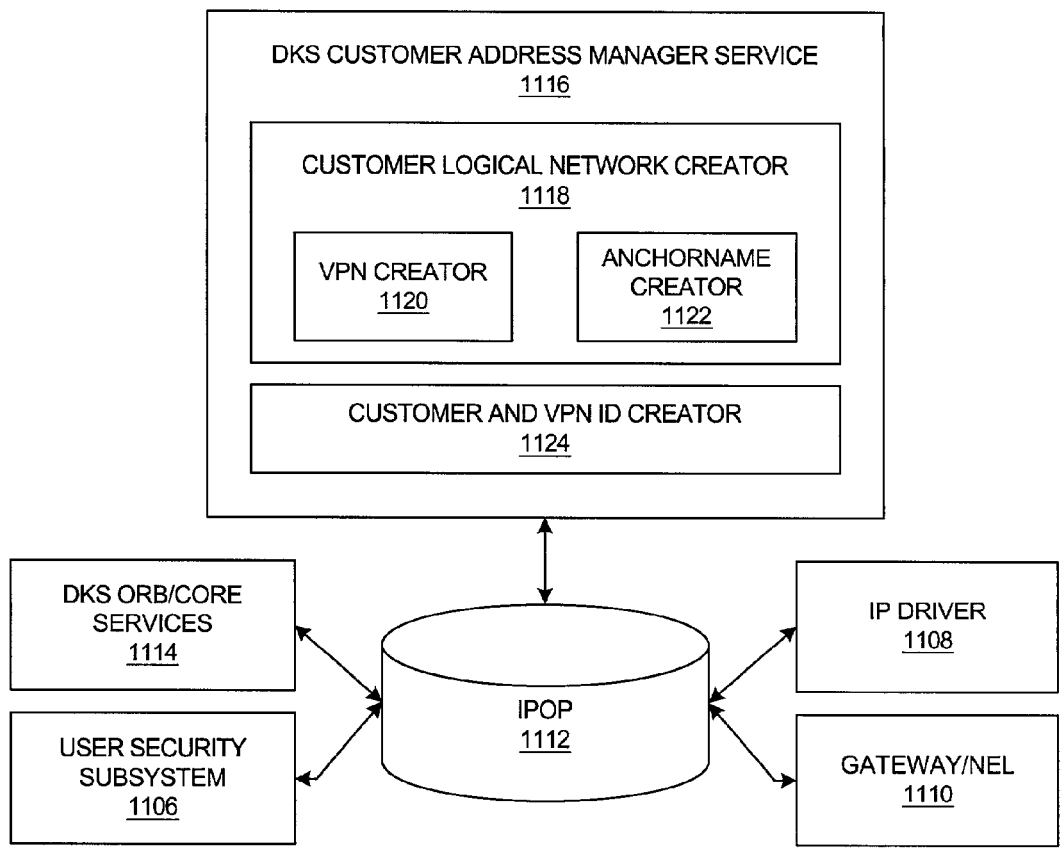
FIG. 11A is a block diagram showing a set of components that may be used to implement multi-customer management across multiple networks in which duplicate address may be present.
FIG. 13 is a figure that depicts a graphical user interface (GUI) that may be used by a network or system administrator to set monitoring parameters for resolving address collisions.

With reference now to FIG. 11A, a block diagram shows a set of components that may be used to implement multi-customer management across multiple networks in which duplicate addresses may be present. FIG. 11A depicts components that are similar to components introduced in other figures above. User security subsystem 1106 provides a user authentication and authorization service, which may be used to verify the identity of users, such as administrators, during a login process and during administrative operations. IP drivers 1108 detect IP objects within an IP network. Gateway/NEL service 1110 provides action object processing within gateways. A persistent repository, such as IPOP database 1112, is updated to contain information about the discovered and monitored IP objects. Other ORB or core services 1114 may also access IPOP database 1112.

Customer address manager service 1116 queries IPOP 1112 during operations that allow an administrator to resolve addressability problems. Customer logical network creator 1118 fetches administrator input about the groupings of physical networks into a logical network, as may be provided by an administrator through an application GUI, such as the GUI shown in FIG. 13. From this input, the various scopes of the physical networks are combined to create a logical scope as previously described above.

VPN creator 1120 fetches administrator input concerning which physical networks belong to which customer. The administrator can provide a name to each physical network collection, which is used by the anchorname creator 1122 to define an anchorname, which is highest level name used to describe a logical network. The final name of each physical network is a combination of the anchorname and the name assigned to each logical network. For example, the name of a logical network consisting of the physical networks 146.5.*.* would be "austin\downtown\secondfloor" comprising the anchorname="austin" and the name="downtown\secondfloor."The anchorname creator supplies a name to the IP Driver subsystem by combining the anchorname, determined from the scope configuration, and the name of the physical network element object from IPOP. Finally, a customer ID creator 1124 uses the collection of IDs used by all customers to generate a new unique customer identifier when required by IPOP; the identifiers are used rather than strings for efficient database searches of large number of network objects. During subsequent operations to map the location of a user to an ORB, customer address manager service 1116 queries may query an active-user database similar to that shown in FIG. 6.

With reference now to FIGS. 11B-11D, some simplified pseudo-code depicts the manner in which action objects and endpoint objects can be implemented in an object-oriented manner. FIG. 11B shows a class for action objects, while FIGS. 11C-11D show classes for endpoint objects.

Figure 12A:
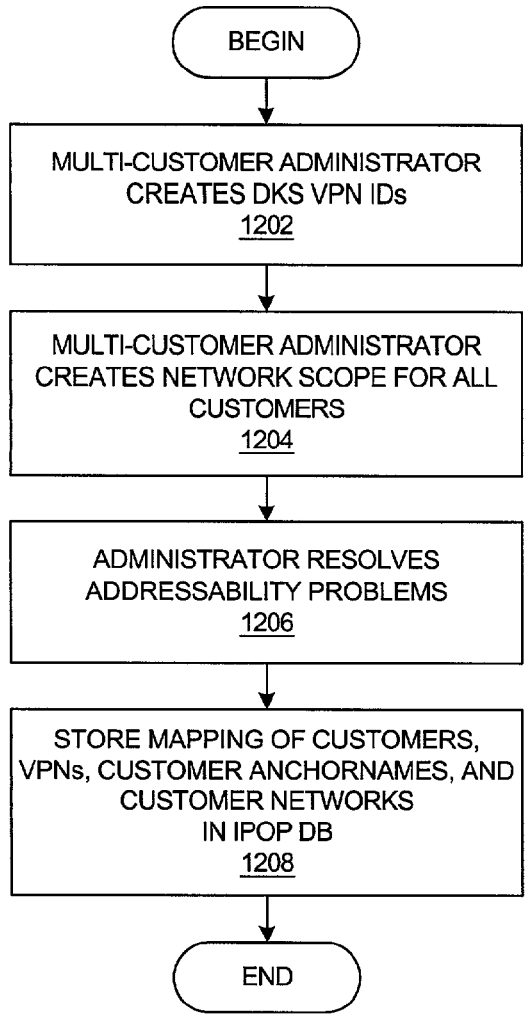
FIG. 12A is a flowchart depicting a portion of an initialization process in which a network management system prepares for managing a set of networks with multiple NATs.

With reference now to FIG. 12A, a flowchart depicts a portion of an initialization process in which a network management system prepares for managing a set of networks with multiple NATs. It is assumed that a network administrator has already performed configuration processes on the network such that configuration information is properly stored where necessary. The process begins when a multi-customer administrator creates DKS VPN IDs during installation (step 1202). For example, after the ORB has started, the ORB starts a Command Line Interface (CLI) Service through which an administrator can issue CLI commands to create VPN IDs within the IPOP database, such as "ipop create VPN" used by customer and VPN ID creator 1124 in order to create a unique customer ID or a unique VPN ID.

The process then continues with the multi-customer administrator creating network scope for one or more customers (step 1204). Multi-customer regions may also be created, which refers to the managing a region that consists of two or more customers for which care has to be taken not to intermix different customer data. At this point, the physical network is discovered via a discovery engine, such as the IP driver service, which performs a discovery process to identify IP objects and stored those in the IPOP persistence storage. For all customer locations, all of the physical networks that have been discovered are displayed to the administrator so that the administrator can conveniently apply names to the discovered objects/networks. In addition, multiple address problems are determined and displayed to the administrator, who is then required to assign a VPN ID to a customer, e.g., by using an application GUI such as that shown in FIG. 13.

Part of the customer scope, i.e. a logical scope consisting of a collection of physical networks as described previously, is the customer anchorname text array, e.g., "ibm\usa\Austin", the customer name, and a unique customer ID, as created by customer address manager service 1116 in FIG. 11A. The hash number is computed by the customer base text name, e.g., "ibm", the network addresses, e.g., all subnets of reserved public addresses, and VPN IDs.

The administrator then resolves any outstanding addressability problems (step 1206). For example, a large corporation may have subnets "10.0.0.*" on each floor of a large office. After those have been resolved, then the system stores the mapping of customers, VPN IDs, customer anchornames, and customer networks in the IPOP database (step 1208), and the initialization process is then complete.

Figure 12B:
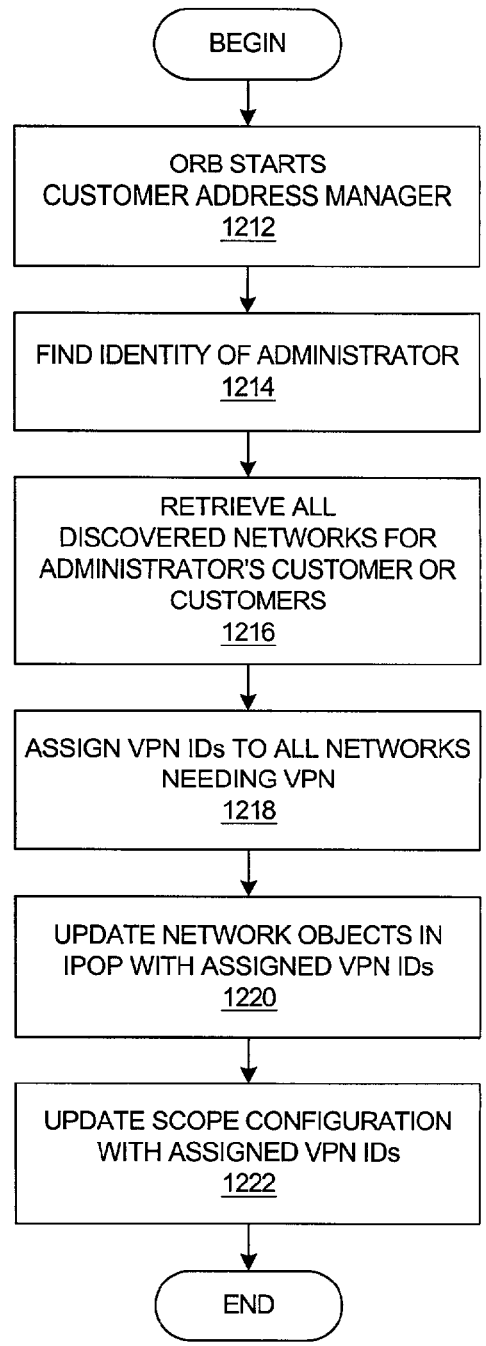
FIG. 12B is a flowchart depicting further detail of the initialization process in which the administrator resolves addressability problems.

With reference now to FIG. 12B, a flowchart depicts further detail of the initialization process in which the administrator resolves addressability problems. FIG. 12B provides more detail for step 1206 shown in FIG. 12A in which an administrator proceeds to resolving identified addressability problems.

The process begins, during the initialization process, as an ORB starts the customer address manager (step 1212). The customer address manager then finds the identity of the administrator that is performing various address management functions through a network management application (step 1214). At this point, the identity of the network administrator may be used to ensure than the administrator has the proper authorization parameters. However, for the sake of explanation, it may be assumed that an administrator with multi-customer rights has access to the GUI to create VPNs for multiple customers, i.e. it may be assumed that an administrator has the proper authorization for working with the data from multiple customers. The multi-customer administrator uses the administrator GUI shown in FIG. 13, which uses the customer address manager, to display all of the discovered networks for the administrator's customer or customers (step 1216).

After retrieving this information, the customer address manager may then allow the administrator to assign VPN IDs to those networks for which it can be determined that the networks have an addressability problem (step 1218). The assigned VPN IDs are then stored as updated information within the network objects within IPOP (step 1220). The scope information is also updated with a VPN ID (step 1222); initially, many scopes are defined as "VPN=0", which means no VPN address. The VPN ID creator ensures that unique VPN IDs are created such that duplicate addresses can exist within a VPN that has an assigned VPN ID. This portion of the initialization process is then complete. The manner in which the administrator assigns VPN IDs is explained in more detail with respect to FIG. 12C.

In order to determine which networks require a VPN ID, the customer address manager sorts through all of the network addresses, looking for problematic addresses. For example, a set of 255 public addresses, such as "10.0.0.*", are reserved for local network purposes. Hence, even if two networks within the network management system do not have colliding local network addresses, the potential for future collisions exists.

Figure 12C:
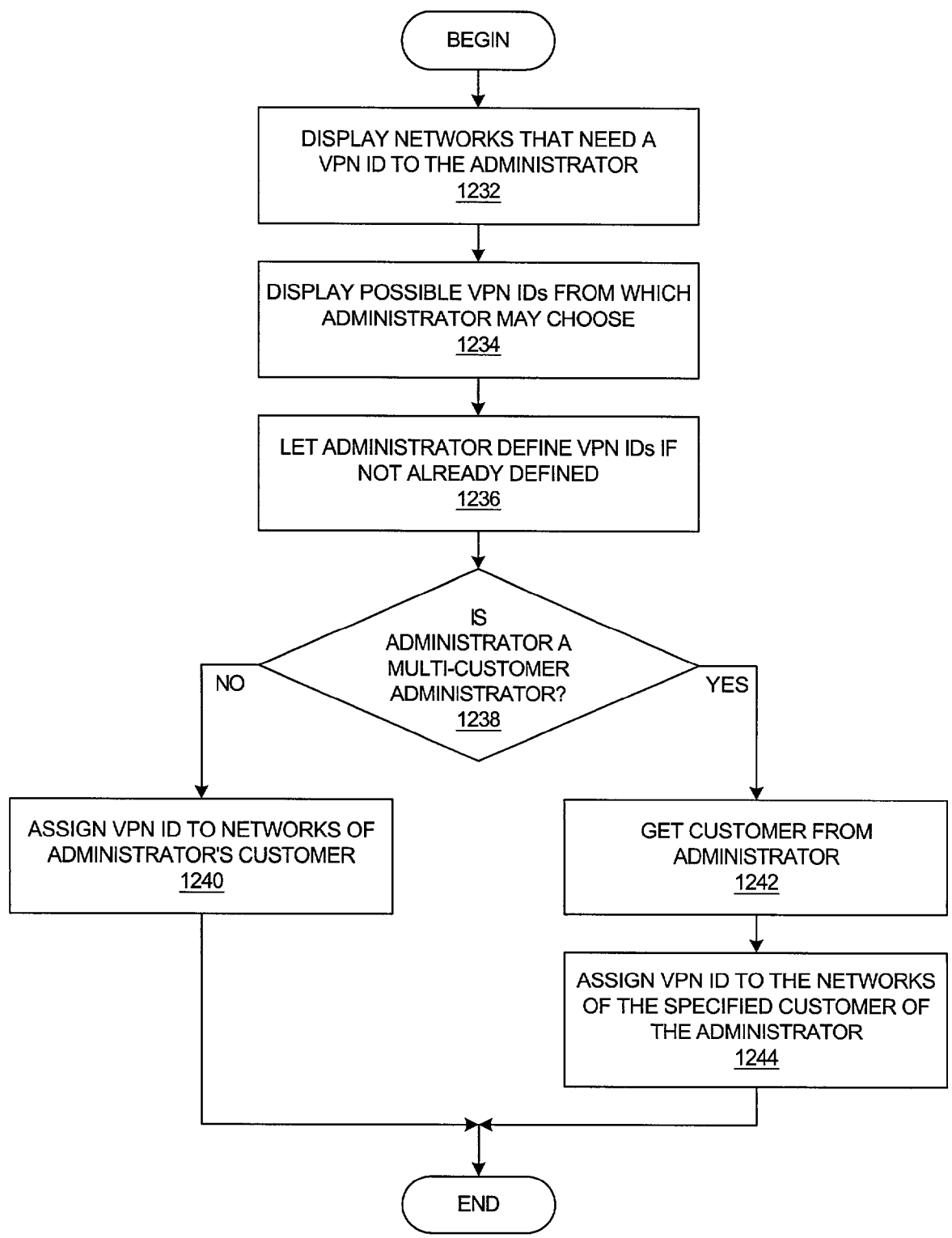
FIG. 12C is a flowchart depicting further detail of the process in which the administrator assigns VPN IDs.

With reference now to FIG. 12C, a flowchart depicts further detail of the process in which the administrator assigns VPN IDs. FIG. 12C provides more detail for step 1218 shown in FIG. 12B. The process begins by displaying those networks have been determined to need a VPN ID assigned since a duplicate address exists, as determined with respect to step 1218 above, to the current administrator (step 1232). The customer address manager then displays a list of possible VPN IDs from which the administrator may choose (step 1234), and the administrator is able to define VPN IDs as necessary if not already defined (step 1236). VPN IDs could have been previously defined through the configuration service, most likely during installation. However, at configuration time, the networks have not yet been discovered, so it is not possible for the system to know if and where duplicate addresses exist. While the figures are described with respect to the actions of a single administrator, a highly distributed system has a collection of administrators that are typically not in one location. Hence, one of goals of the DKS management framework is to detect errors and allow the administrators to have input into the manner in which the errors should be corrected.

A determination is then made as to whether the administrator is a multi-customer administrator (step 1238). If not, then the VPN ID that has been chosen by the administrator can be assigned to the networks of the administrator's customer (step 1240). If the administrator is a multi-customer administrator, then the customer address manager must get a specific customer from the administrator (step 1242), and the chosen VPN ID is assigned to the specified customer (step 1244). This portion of the initialization process is then complete. After these initialization steps, the administrator has an overall addressing scheme that should be coherent. The IP addresses, VPN IDs, and other information, when taken together, provides a scheme for unique identifiers that the management system can use to manage the devices throughout the system.

With reference now to FIG. 13, a figure depicts a graphical user interface window that may be used by a network or system administrator to set monitoring parameters for resolving address collisions. Window 1350 is a dialog box that is associated with a network management application; a system or network administrator is required to create or enter VPN IDs to resolve duplicate addresses that have been detected, such as physical network addresses 1352 and 1354. An administrator could also invoke the application on a regular basis when necessary, or it could be invoked automatically by the network management system when address collisions are detected. "Set" button 1374 and "Clear" button 1376 allow the administrator to store the specified values or to clear the specified parameters. Checkbox 1378 allows an administrator to quickly change the VPN ID for an entire physical scope indicated within window 1350.

Figures 14A, 14B:
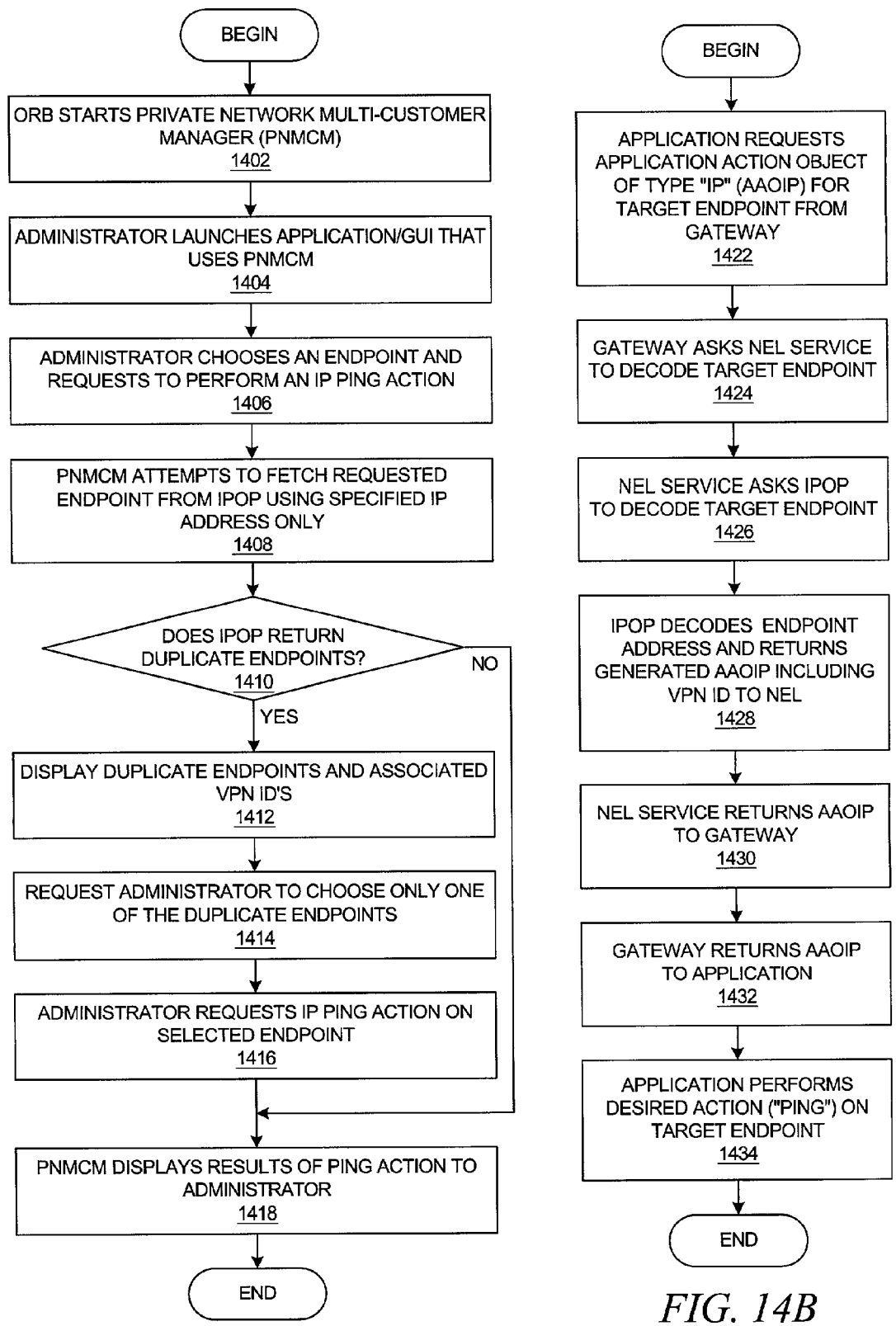
FIG. 14A is a flowchart showing the overall process for performing an IP "Ping" with in a multi-customer, distributed data processing system containing multiple private networks.
FIG. 14B is a flowchart that depicts a process by which an administrator chooses the source endpoint and target endpoint for the IP "Ping" action described in an overall manner in FIG. 14A.

FIGS. 14A-14B depict examples of processes that may be performed by the network management system after system configuration/initialization when an administrator is using a network management application to perform a certain operation, such as a simple IP "Ping" command as shown in the example. While the example shows a simple IP "Ping" action, a more complex action could include a software distribution application that installs software on endpoints throughout the distributed data processing system.

With reference now to FIG. 14A, a flowchart shows the overall process for performing an IP "Ping" within a multi-customer, distributed data processing system containing multiple private networks. The process begins when an ORB starts a private network multi-customer manager (PNMCM) that is used by the system to perform certain actions, such as requesting an IP "Ping" (step 1402). The user of the application, which in this case is a network or system administrator for a particular customer, launches an application associated with the PNMCM (step 1404). Within the application, the administrator chooses an endpoint and requests an IP "Ping" action, most likely from hitting a "Ping" button within the GUI (step 1406).

The PNMCM manager attempts to fetch the requested endpoint from the IPOP database using only the IP address as specified or selected by an administrator within an application GUI (step 1408). A determination is then made as to whether IPOP returns duplicate endpoints (step 1410). If not, then the process branches to show the results of the requested "Ping" action.

If there is a collision among duplicate IP addresses, they are displayed to the administrator along with the previously associated VPN IDs that help to uniquely identify the endpoints (step 1412). The administrator is requested to choose only one of the duplicate endpoints (step 1414), and after choosing one, the administrator may request to perform the "Ping" action on the selected endpoint (step 1416). The PNMCM displays the results of the "Ping" action to the administrator (step 1418), and the process is complete.

With respect to FIG. 14B, a flowchart depicts a process for obtaining and using an application action object (AAO) within the network management system of the present invention. An application action object is a class of objects that extends an action object class in a manner that is appropriate for a particular application. The process begins when an application requests, from the gateway service, an application action object (AAO) for a "Ping" action (AAOIP) against a target endpoint (step 1422). The process assumes that the administrator has already chosen the source and target endpoints through some type GUI within a network management application.

The gateway service asks the NEL service to decode the target endpoint from the request (step 1424). As noted previously, one of the primary roles of the NEL service is to support the requests from applications for routes, as explained above with respect to FIG. 3. The NEL service then asks the IPOP service to decode the endpoint object (step 1426). Assuming that the processing has been successfully accomplished, IPOP returns an appropriate AAOIP object to the NEL service, including VPN ID if necessary (step 1428), and the NEL service returns the AAOIP object to the gateway service (step 1430). The gateway service then returns the AAOIP object to the application (step 1432). The application then performs the desired action (step 1434), such as an IP "Ping", and the process is complete.

The description of FIGS. 11A-14B explain a methodology for configuring the network management framework to manage the networks of multiple customers; by employing scopes and anchors, the logical networks can be configured and managed. As described above with respect to FIGS. 5A-5C, when a network is discovered, it is associated with a particular scope, and each scope relates to an anchor. Scope configuration is important to the proper operation of the IP drivers because IP drivers assume that there are no overlaps in the drivers' scopes. Since there should be no overlaps, every IP driver has complete control over the objects within its scope. When IP mapper is informed that a new network has been discovered, it uses the scope associated with the network to determine with which anchor, i.e. customer, the newly discovered network should be associated, and the appropriate updates are also made within the topology database.

Assuming that an administrative user has the proper security access, the administrative user should have the ability to modify various management aspects of scopes and anchors within the network management framework, although scope manipulation can be quite complex. For example, an administrative user may incorrectly attempt to change the manner in which a set of endpoints is managed such that a conflict between scopes arises. Hence, the network management framework needs to be able to display scopes properly in order for an administrative user to be able to retrieve and view the topology of the networks that are being managed.

As noted previously, in a highly distributed system comprising on the order of a million devices with many customers and administrators using a common network management framework provided by a single service provider, system displays that varied only with respect to network-related information would be inadequate. For example, a typical network management application displays information associated with the physical or logical configurations of a set of networks, such as information pertaining to the status and type of devices or communication links within the distributed system. These displays may graphically differentiate system information using various types of icons or color-coded information so that an administrative user can view portions of networks in an easy-to-understand, graphical manner. However, for a large distributed system such as those intended to be managed by the network management framework disclosed herein, typical application displays would be filled with similar icons for most subnetworks, which would be rather monotonous for an administrative user, and most displays may appear to be redundant.

Hence, the network management framework of the present invention provides the ability for an administrative user to enhance or customize the graphical displays of network-related information by incorporating other graphical items in order to make the topology display more user-friendly. A typical network management application display of device icons can be rather tiresome. In the present invention, an administrator can add, select, or otherwise incorporate a variety of user-friendly icons and digital images that depict additional types of information; these topology display enhancements are described in more detail further below.

Approaching the problem from one direction, enhancing and/or customizing the presentation of topology information within a network management framework helps to alleviate the problem of information overload associated with viewing information generated by a highly distributed system comprising on the order of a million devices with many customers and administrators using a common network management framework provided by a single service provider. Approaching the problem from a different direction, restricting and/or minimizing the presentation of topology information within a network management framework would also help to alleviate the problem of information overload.

Typically, a network management application allows an administrative user to vary the amount of detail that can be viewed with respect to the components or status of a network system, such as zooming in and out of a topology display, which would be useful but inadequate for the present invention.

In contrast, the network management framework of the present invention provides the ability for an administrative user to limit the amount of network-related information in a topology display with respect to the security access of the administrative user, with respect to the scopes that are defined within the topology, and with respect to the logical divisions of customers throughout the distributed data processing system. These topology display restrictions are described in more detail further below.

In the present invention, the network management framework can manage the physical networks of multiple customers as a conglomeration of logical networks. To this end, the network management framework uses the concept of an anchor. As explained above, an anchor is a root name in a hierarchical naming space under which the network management framework can associate networks. From a more dynamic perspective, an anchor is the foundational element with which the network management framework can associate the topology which is discovered by the network management framework. Users can define, under an anchor, scopes that belong to the same customer, to the same logical or geographic region, or to some other logical association.

The "anchorname" is the name within a hierarchical name space with which the network management framework can associate other logical identifiers. An anchorname is the highest level (root) name used to describe a hierarchical, logical network. The final name of each physical network is a combination of the anchorname and the name assigned to each logical network. For example, the name of a logical network consisting of the physical networks in 146.5.*.* could be "austin\downtown\secondfloor" comprising the anchorname="austin" and the name="downtown\secondfloor." As shown with respect to FIG. 13, an administrative user can supply an anchorname through an anchorname creator GUI; the supplied anchorname is provided to the IP driver subsystem, which combines the anchorname with other IPOP information to generate a unique name for each network element object within IPOP.

In addition to managing logical networks using an anchor, the network management framework of the present invention uses special container objects termed "aggregate topology objects" to manage logical networks. The basic information discovered by an IP driver is shown to an administrative user through a GUI, such as that shown in FIG. 9A, in a tree format via the topology service. The topology service provides four types of objects. The first type of topology object is an aggregate topology object; aggregate topology objects act as containers and contain data as well as other topology objects. The second type of topology object is merely termed a "topology object"; topology objects contain data only and cannot contain other container objects, yet topology objects can exist in multiple containers. The third type of topology object is an aggregate relation, which would be presented within a GUI as a line to depict a relationship between two objects; aggregate relations can be formed between topology objects and aggregate topology objects in order to place a topology object inside of a container. The last type of topology object is a peer relation object representing a peer relation; peer relations can be formed between topology objects that exist within the same container.

A customer may be represented within a topology map by creating an aggregate topology object for the customer's anchor. At a highest possible level, a service provider may be represented within a topology map by creating an aggregate topology object for the service provider, which then contains a plurality of customer containers.

Figure 15:
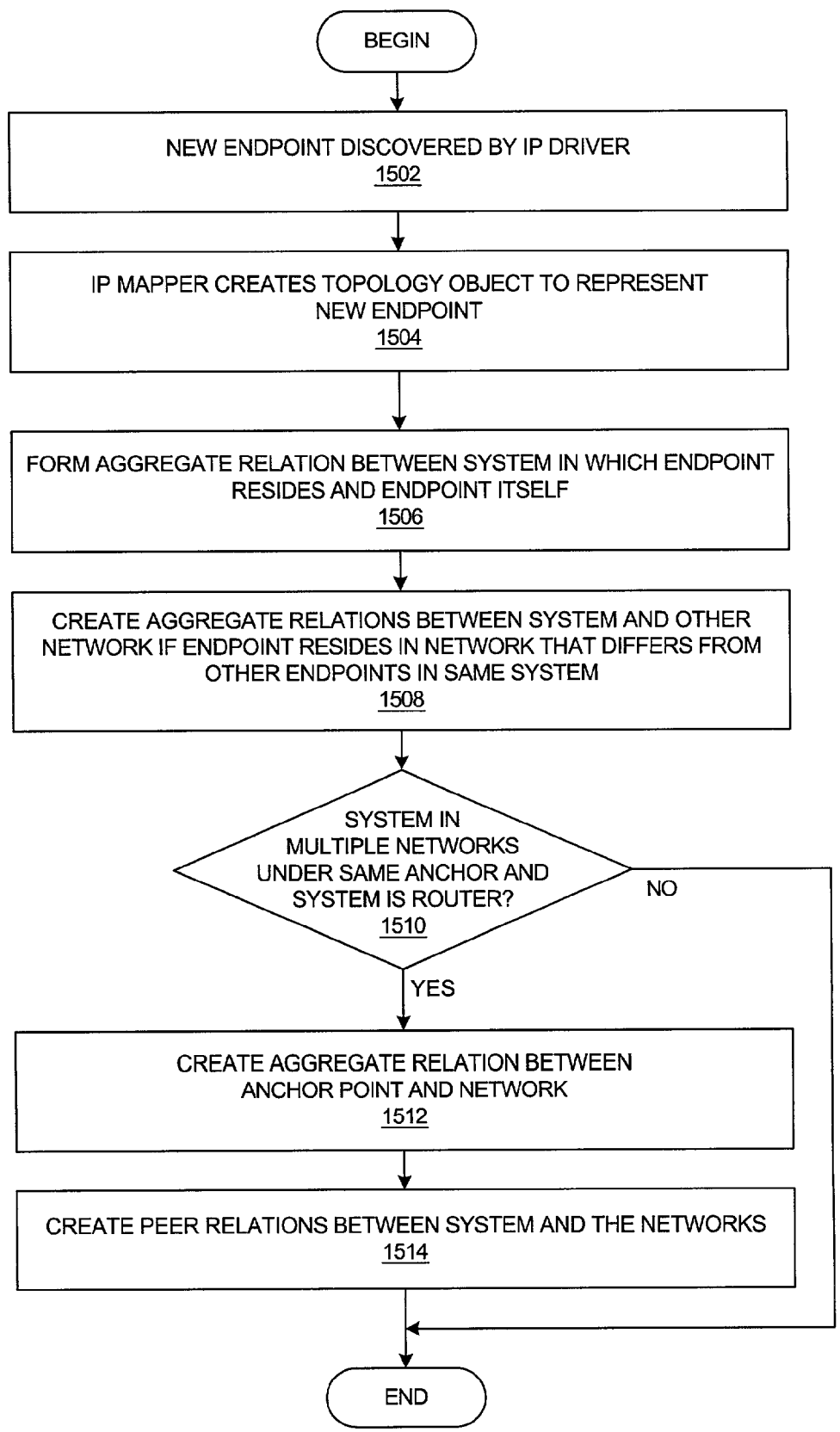
FIG. 15 is a flowchart depicting a process in which a newly discovered endpoint can be added to a multi-customer topology.
Figure 16A:
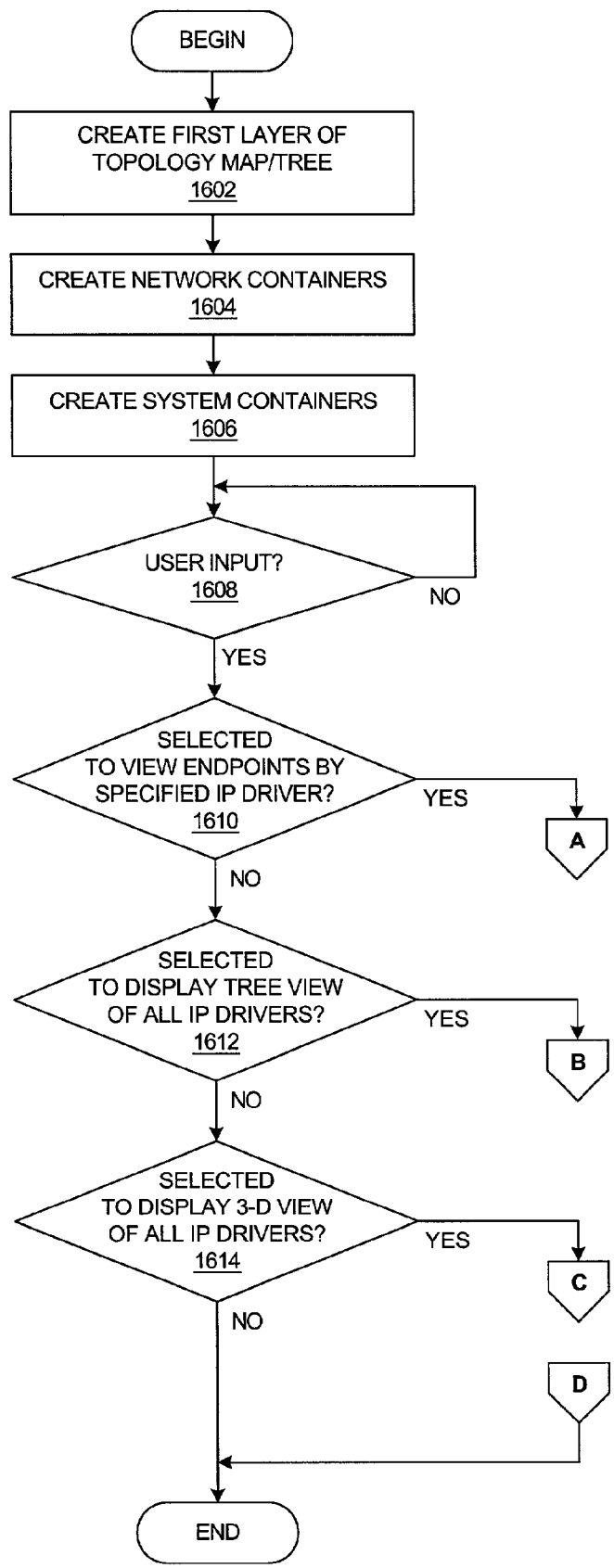
FIGS. 16A-16D are flowcharts depicting a process in which the network management framework can create different types of multi-customer topology views for an administrative GUI application using the anchor container objects of the present invention.
Figure 16B:
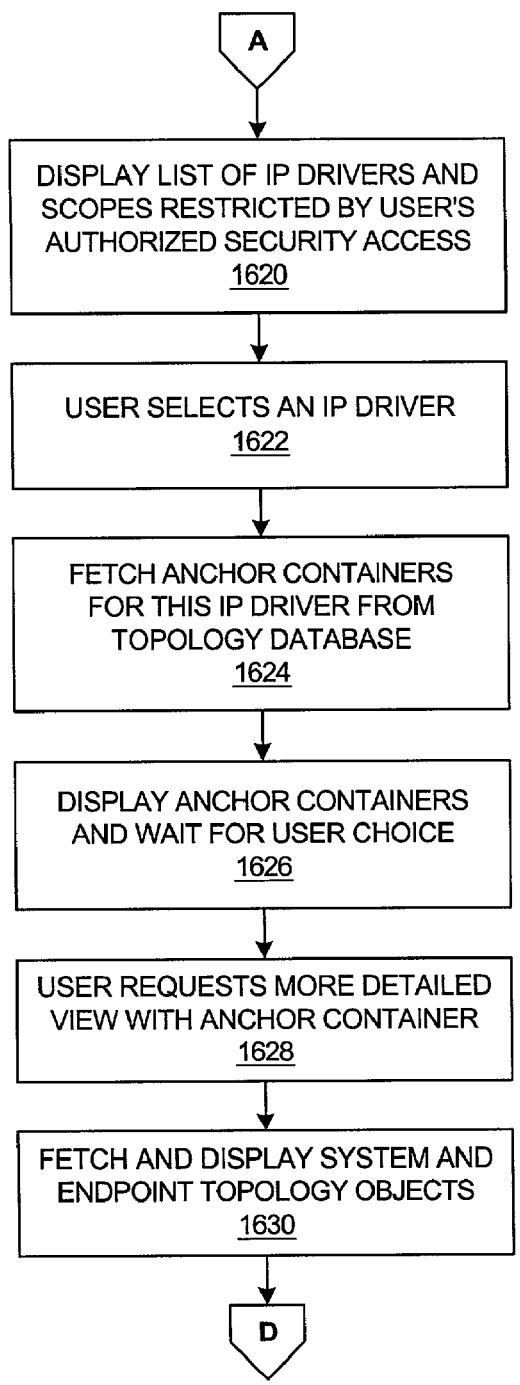
Figure 16C:
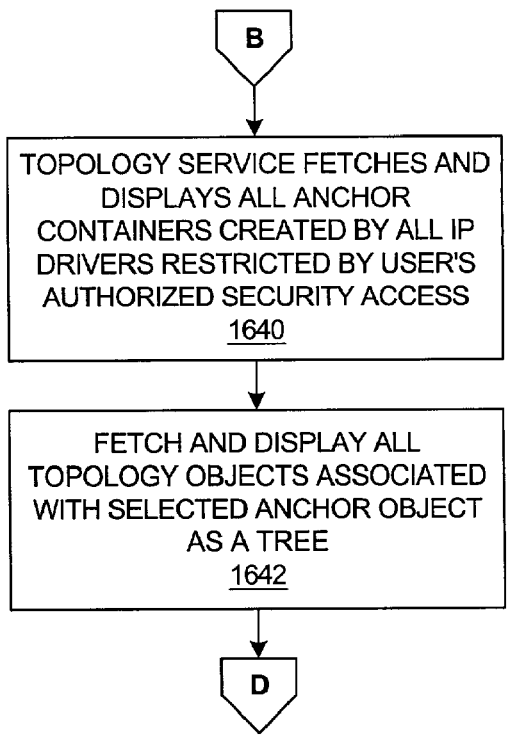
Figure 16D:
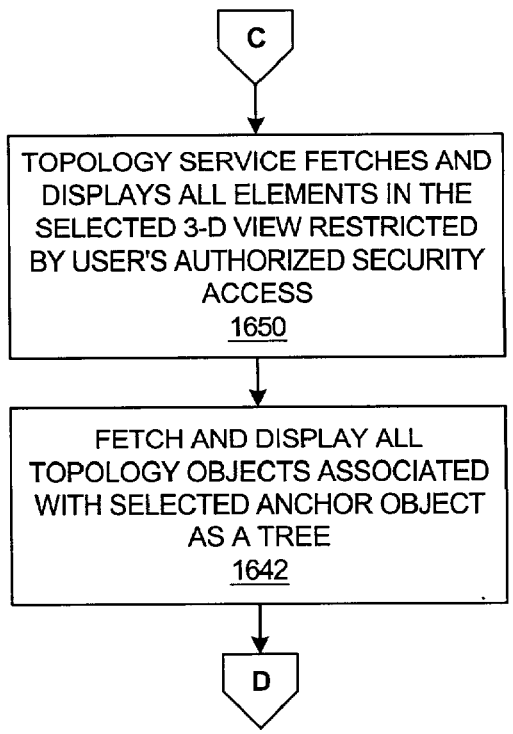

With reference now to FIG. 15, a flowchart depicts a process in which a newly discovered endpoint can be added to a multi-customer topology. The process shown in FIG. 15 is similar to the process shown in FIG. 8A except that FIG. 15 provides more detail with respect to a multi-customer topology. The process begins with a new endpoint being discovered by an IP driver (step 1502) and the IP mapper for the IP driver creates a topology object to represent the new endpoint (step 1504).

Various aggregate relations may possibly be needed for the newly discovered endpoint. First, an aggregate relation is formed between the system in which the endpoint resides and the endpoint itself (step 1506). If the endpoint resides in a network in which the other endpoints within the endpoint's system do not reside, then a relation needs to be created between the endpoint's system and its network (step 1508).

A determination is then made as to whether or not the endpoint's system now resides in multiple networks underneath the same anchor, which would necessarily also mean within the same customer, and whether the endpoint's system is a router (step 1510). If not, then no further action is required. If so, then an aggregate relation needs to be created between the anchor object and the network (step 1512), and peer relations are created between the networks and the system (step 1514).

After completing the creation of the topology objects, the data must be persisted within the IPOP and topology databases, after which the process can be considered to be complete. The IP mapper writes the endpoint object to the IPOP database and to the topology database, after which the IP mapper listens for a successful write to both the IPOP database and the topology database. If both writes complete successfully, then the both writes are committed to the respective database.

With reference now to FIGS. 16A-16D, a set of flowcharts depicts a process in which the network management framework can create different types of multi-customer topology views for an administrative GUI application using the anchor container objects of the present invention. The process begins with the IP mapper requesting that the topology service create the first layer of a topology tree/map to be displayed (step 1602). In the present invention, the first layer of a topology map would be the anchors, which would usually represent different customers; hence, the anchor objects, which are container objects, are created for holding their respective networks are placed in the appropriate anchor containers. IP mapper then requests that the topology service create network containers for holding their respective system objects (step 1604). IP mapper subsequently requests that the topology service create system containers for holding their respective endpoint objects (step 1606).

After this setup process, the IP driver essentially begins listening to any containers that the topology service subsequently displays in the administrative GUI application for user input that requests some manner for viewing the topology information. Hence, the IP driver begins waiting for the user to select or activate a particular view of the topology information (step 1608).

If the user selects to view endpoints by a specific IP driver (step 1610), then the process branches to handle this choice. If the user selects to view information in a tree view showing everything has been discovered by all IP drivers, then the process branches to handle this choice (step 1612). If the user selects to view the information in a three-dimensional view showing everything that has been discovered by all IP drivers, then the process branches to handle this particular choice (step 1614). If none of these views have been chosen, then the process may be considered to be completed, although the administrative GUI application would most likely continue to cycle waiting for additional user input. Alternatively, other view choices may be available to the user.

In order to process the selection at step 1610, the GUI application via the topology service displays a list of IP drivers and their respective scopes from which the administrative user may choose, although the list is based on whether or not the administrator has authorized security access to a particular scope or IP driver (step 1620). The administrative user then chooses a particular IP driver from the list (step 1622), and the topology service fetches the anchor containers that were created by this IP driver from the topology database (step 1624). The GUI application then displays all of the anchors associated with the selected IP driver and waits for the administrative user to choose one of the anchors (step 1626), after which the user may select one of the anchors in order to examine more closely the topology under the selected anchor (step 1628). When an anchor is selected, then the topology service fetches topology objects associated with this particular network, i.e. system and endpoint topology objects, and displays them (step 1630). The user may continue exploring the topology of these objects, after which the process may be considered to be complete.

In order to process the selection at step 1612, the GUI application via the topology service obtains a list of all IP drivers, although the list is based on whether or not the administrator has authorized security access to a particular scope or IP driver. The topology service fetches all anchor containers that were created by these IP drivers from the topology database (step 1640). The GUI application then displays all of the anchors associated with these IP drivers and waits for the administrative user to choose one of the anchor container objects, after which the topology service then fetches the topology objects associated with this particular anchor and displays them as a tree (step 1642). The user may continue exploring the topology of these objects, after which the process may be considered to be complete.

In order to process the selection at step 1614, the GUI application via the topology service obtains all elements in the selected 3-D view from the topology database (step 1650). The GUI application then displays all of the allowable elements based on whether or not the administrator has authorized security access to a particular element (step 1652). The 3-D tree view is displayed such that the elements are arranged as a tree, but all branches of the tree have already been expanded or extended; preferably, the depth of the elements within the tree are shown based on how far or close the endpoints are from the anchor customer in a distance relationship. The user may continue exploring the topology of these objects, after which the process may be considered to be complete.

As previously described above, the network management framework may contain a security subsystem for determining whether or not an administrative user has authorized access to a scope, logical network, etc. Because all topology objects and IPOP objects can be associated with a security context, the display of topology objects can easily be restricted within the network management framework of the present invention, as shown in FIGS. 16A-16D.

Figure 17:
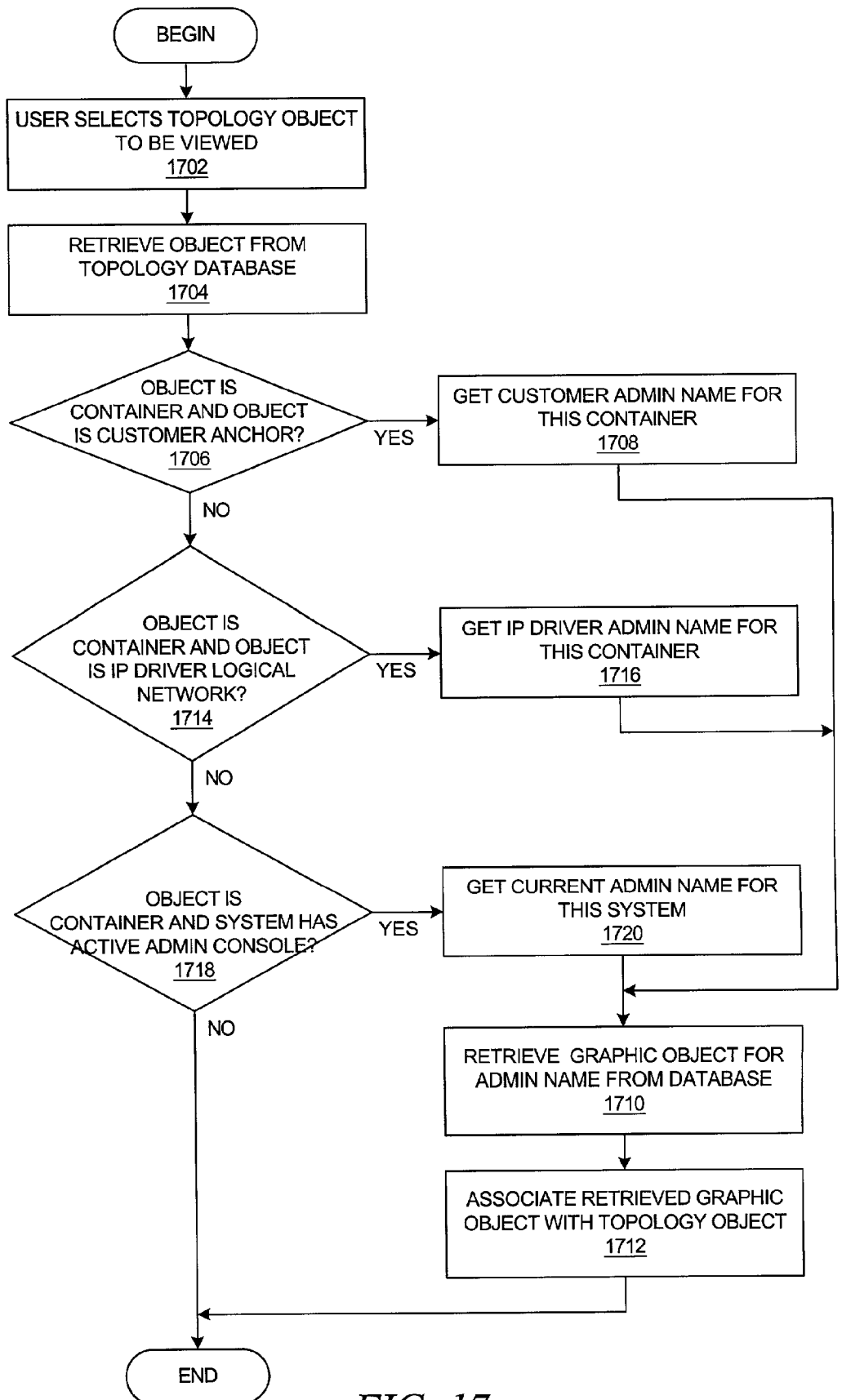
FIG. 17 is a flowchart depicting a process in which a display of a topology tree can be enhanced with non-network-related information

With reference now to FIG. 17, a flowchart depicts a process in which a display of a topology tree can be enhanced with non-network-related information. As noted above, a topology display of more than a million devices could be very repetitive, no matter what view or subview of the distributed data processing system is requested by an administrative user. Given the manner in which the topology service within the network management framework employs container objects for displaying the topology of the system, the present invention takes advantage of the container objects to allow the topology display to be customized, as explained below.

The process begins with an administrative user selecting a topology object to be viewed within a network management application that is displaying a topology map within its GUI (step 1702). In response, the topology service requests the object from the topology database (step 1704).

A determination is then made as to whether the selected object is a container object and whether the object is a customer anchor object (step 1706). If so, then the topology service gets the customer administrator name that has been specified as being responsible for the customer's logical network that is associated with the anchor object (step 1708); the topology service can ask the IP mapper to query the IPOP database to retrieve this information. The customer administrator name is then used to retrieve the administrator's picture from the appropriate database (step 1710), and the retrieved picture is associated with the selected container object (step 1712), and the process is complete.

If the determination is negative at step 1706, a determination is then made as to whether the selected object is a container object and whether the object is an IP driver logical network object (step 1714). If so, then the topology service gets the administrator name that has been specified as being responsible for the selected logical network (step 1716). The name of the IP driver's administrator is then used to retrieve the administrator's picture from the appropriate database (step 1710), and the retrieved picture is associated with the selected container object (step 1712), and the process is complete.

If the determination is negative at step 1714, a determination is then made as to whether the selected object is a container object and whether the object is a system with an active administrative console (step 1718). If so, then the topology service gets the administrator name that is currently logged into the system (step 1720); this may be obtained from a database such as active user database 606 shown in FIG. 6A. The name of the system's administrator is then used to retrieve the administrator's picture from the appropriate database (step 1710), and the retrieved picture is associated with the selected container object (step 1712), and the process is complete.

The determination steps 1706, 1714, and 1718 are merely examples of the types of conditions that may be evaluated in an attempt to retrieve a graphic image or icon for the selected topology object. Other conditions may be configurable through the configuration service and may be based on various combinations of determinations, such as system state, available graphics, etc.

After a new graphic object is associated with the container object, the topology service then retrieves the container's graphic object for display rather than displaying a default graphic or icon. Instead of forcing the topology service to wait for a user action before setting a new graphic object for the container, the topology service may initiate the retrieval itself; for example, the topology service may consult a configuration service for a policy concerning the manner in which graphic objects should be handled by the topology service.

The examples in FIG. 17 show that a previously stored administrator picture may be used in place of a graphic icon. However, other types of graphic images could be obtained, such as flags that indicate a country location of a particular network, system, or endpoint. Moreover, real-time or near-real-time digital images could be retrieved; for example, a security camera that is directed at a system device could be shown, thereby providing a useful security purpose through a topology map.

The advantages of the present invention should be apparent in view of the detailed description of the invention that is provided above. A network management framework flexibly manages multiple customers within a highly distributed system. The network management system allows a network administrator to vary the GUI display of topology by viewing non-network related information along with the topology of the physical and logical organizations of the networks that are being managed. In addition, the network management framework allows an administrative user to restrict the display of the topology of the networks in accordance with the security access of the user and/or in accordance with the logical divisions of the distributed data processing system with respect to multiple customers.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for management of a distributed data processing system, the method comprising:
    associating a set of logical networks in the distributed data processing system and/or a set of physical networks in the distributed data processing system with an anchor object, wherein different physical networks within the distributed data processing system may support duplicate network addresses;
    managing a set of anchor objects, wherein each anchor object has an anchorname which is a root name within a hierarchical naming space that represents a hierarchical logical network, wherein each anchorname is a unique name within the distributed data processing system, and wherein usage of an anchorname in combination with subnet information for a logical network supports unique addressing within a logical network;
    uniquely associating each anchor object in a set of anchor objects with a customer in a set of customers, wherein the distributed data processing system is managed on behalf of a plurality of customers;

generating a topology map that includes a plurality of anchor objects; and displaying the topology map.

2. The method of claim 1 further comprising:

editing the topology map by creating topology elements including relations to other topology elements which may include anchor objects.

3. The method of claim 2 further comprising:

creating a user-defined topology element container.

4. The method of claim 3 further comprising:

creating relations between the user-defined topology element container and other containers.

5. The method of claim 1 further comprising:

receiving a customer-defined topology comprising customer-defined topology elements.

6. The method of claim 5: wherein the customer-defined topology elements are containers containing other elements.

7. The method of claim 5 further comprising:

receiving a customer-defined anchorname name to be collectively associated with elements within the anchor object.

8. The method of claim 7 further comprising:

discovering customization resources to be associated with elements of the customer-defined topology.

9. The method of claim 8 further comprising:

determining a customization resource based on an association between an identity of a user and a customer-defined topology element.

10. The method of claim 1 further comprising:

simultaneously displaying a plurality of anchor objects.

11. The method of claim 1 further comprising:

providing a selection mechanism whereby a user may select a displayed object; and displaying detailed information for a selected object.

12. The method of claim 11 further comprising:

determining whether a user has authorized access to the detailed information for the selected object; and restricting a display operation for the detailed information for the selected object to data items in the detail information for which the user has authorized access.

13. The method of claim 11, wherein the anchor object is a container object, further comprising:

retrieving an alternative graphic object for representing the selected object; and displaying the alternative graphic object.

14. The method of claim 1 further comprising:

allowing an administrative user to select a display view of the topology map, wherein the display view of the topology map comprises a hierarchical tree view of all objects discovered by a user-specified distributed discovery controller.

15. The method of claim 1 further comprising:

representing the distributed data processing system as a set of scopes, wherein a scope comprises a logical organization of network-related objects;

associating each scope with a customer, wherein each scope is uniquely assigned to a management customer;

managing the distributed data processing system as a set of logical networks, wherein a logical network comprises a set of scopes, and wherein each logical network is uniquely assigned to a customer.

16. The method of claim 1 further comprising:

dynamically discovering endpoints, systems, and networks within the distributed data processing system; correspondingly representing endpoints, systems, and networks within the distributed data processing system as a set of endpoint objects, system objects, and network objects; and logically organizing the endpoint objects, system objects, and network objects within a set of scopes, wherein each endpoint object, each system object, and each network object is uniquely assigned to a scope such that scopes do not logically overlap.

17. A method for management of a distributed data processing system, the method comprising:

associating a set of logical networks in the distributed data processing system and/or a set of physical networks in the distributed data processing system with an anchor object, wherein different physical networks within the distributed data processing system may support duplicate network addresses;

managing a set of anchor objects, wherein each anchor object has an anchorname which is a root name within a hierarchical naming space that represents a hierarchical logical network, wherein each anchorname is a unique name within the distributed data processing system, and wherein usage of an anchorname in combination with subnet information for a logical network supports unique addressing within a logical network;

uniquely associating each anchor object in a set of anchor objects with a customer in a set of customers, wherein the distributed data processing system is managed on behalf of a plurality of customers;

creating a customer-defined topology;

associating the customer-defined topology with a topology derived from a physical network to form a combined topology map;

associating customization resources with elements within the combined topology map; and displaying the combined topology map.

18. The method of claim 17 further comprising:

requesting a network management operation based on the combined topology map.

19. A method for management of a distributed data processing system, wherein the distributed data processing system is managed on behalf of a plurality of management customers, the method comprising:

representing the distributed data processing system as a set of scopes, wherein a scope comprises a user-defined logical organization of network-related objects, wherein different scopes within the distributed data processing system may support duplicate network addresses;

associating each scope with an anchor object, wherein an anchor object is uniquely assigned to a management customer;

managing a set of anchor objects, wherein each anchor object has an anchorname which is a root name within a hierarchical naming space that represents a hierarchical logical network, wherein each anchorname is a unique name within the distributed data processing system, and wherein usage of an anchorname in combination with subnet information for a logical network supports unique addressing within a logical network;

generating a topology map,; and allowing an administrative user to select a display view of the topology map.

20. The method of claim 19 wherein a display view of the topology map comprises a hierarchical tree view of all objects discovered by a user-specified distributed discovery controller.

21. The method of claim 19 wherein a display view of the topology map comprises a hierarchical tree view of all objects discovered by a plurality of distributed discovery controllers.

22. The method of claim 19 wherein a display view of the topology map comprises a hierarchical tree view of all objects discovered by all distributed discovery controllers for which a user has authorized access.

23. An apparatus for managing a distributed data processing system, the apparatus comprising:
means for associating a set of logical networks in the distributed data processing system and/or a set of physical networks in the distributed data processing system with an anchor object, wherein different physical networks within the distributed data processing system may support duplicate network addresses;
means for managing a set of anchor objects, wherein each anchor object has an anchorname which is a root name within a hierarchical naming space that represents a hierarchical logical network, wherein each anchorname is a unique name within the distributed data processing system, and wherein usage of an anchorname in combination with subnet information for a logical network supports unique addressing within a logical network;
means for uniquely associating each anchor object in a set of anchor objects with a customer in a set of customers, wherein the distributed data processing system is managed on behalf of a plurality of customers;
means for generating a topology map that includes a plurality of anchor objects,; and
means for displaying the topology map.

24. The apparatus of claim 23 further comprising:
means for editing the topology map by creating topology elements including relations to other topology elements which may include anchor objects.

25. The apparatus of claim 24 further comprising:
means for creating a user-defined topology element container.

26. The apparatus of claim 25 further comprising:
means for creating relations between the user-defined topology element container and other containers.

27. The apparatus of claim 23 further comprising:
means for receiving a customer-defined topology comprising customer-defined topology elements.

28. The apparatus of claim 27 wherein the customer-defined topology elements are containers containing other elements.

29. The apparatus of claim 27 further comprising:
means for receiving a customer-defined name to be collectively associated with elements within the anchor object.

30. The apparatus of claim 29 further comprising:
means for discovering customization resources to be associated with elements of the customer-defined topology.

31. The apparatus of claim 30 further comprising:
means for determining a customization resource based on an association between an identity of a user and a customer-defined topology element.

32. The apparatus of claim 23 further comprising:
means for simultaneously displaying a plurality of anchor objects.

33. The apparatus of claim 23 further comprising:
means for providing a selection mechanism whereby a user may select a displayed object; and
means for displaying detailed information for a selected object.

34. The apparatus of claim 33 further comprising:
means for determining whether a user has authorized access to the detailed information for the selected object; and
means for restricting a display operation for the detailed information for the selected object to data items in the detail information for which the user has authorized access.

35. The apparatus of claim 33, wherein the anchor object is a container object, further comprising:
means for retrieving an alternative graphic object for representing the selected object; and
means for displaying the alternative graphic object.

36. The apparatus of claim 23 further comprising:
means for allowing an administrative user to select a display view of the topology map, wherein a display view of the topology map comprises a hierarchical tree view of all objects discovered by a user-specified distributed discovery controller.

37. The apparatus of claim 23 further comprising:
means for representing the distributed data processing system as a set of scopes, wherein a scope comprises a logical organization of network-related objects;
means for associating each scope with a customer, wherein each scope is uniquely assigned to a management customer;
means for managing the distributed data processing system as a set of logical networks, wherein a logical network comprises a set of scopes, and wherein each logical network is uniquely assigned to a customer.

38. The apparatus of claim 23 further comprising:
means for dynamically discovering endpoints, systems, and networks within the distributed data processing system;
correspondingly representing endpoints, systems, and networks within the distributed data proces sing system as a set of endpoint objects, system objects, and network objects; and
means for logically organizing the endpoint objects, system objects, and network objects within a set of scopes, wherein each endpoint object, each system object, and each network object is uniquely assigned to a scope such that scopes do not logically overlap.

39. An apparatus for management of a distributed data processing system, the apparatus comprising:
means for associating a set of logical networks in the distributed data processing system and/or a set of physical networks in the distributed data processing system with an anchor object, wherein different physical networks within the distributed data processing system may support duplicate network addresses;
means for managing a set of anchor objects, wherein each anchor object has an anchorname which is a root name within a hierarchical naming space that represents a hierarchical logical network, wherein each anchorname is a unique name within the distributed data processing system, and wherein usage of an anchorname in combination with subnet information for a logical network supports unique addressing within a logical network;
means for uniquely associating each anchor object in a set of anchor objects with a customer in a set of customers, wherein the distributed data processing system is managed on behalf of a plurality of customers;
means for creating a customer-defined topology;
means for associating the customer-defined topology with a topology derived from a physical network to form a combined topology map;

means for associating customization resources with elements within the combined topology map; and means for displaying the combined topology map.

40. The apparatus of claim 39 further comprising:

means for requesting a network management operation based on the combined topology map.

41. An apparatus for management of a distributed data processing system, wherein the distributed data processing system is managed on behalf of a plurality of management customers, the apparatus comprising:

means for representing the distributed data processing system as a set of scopes, wherein a scope comprises a user-defined logical organization of network-related objects, wherein different scopes within the distributed data processing system may support duplicate network addresses;

means for associating each scope with an anchor object, wherein an anchor object is uniquely assigned to a management customer;

means for managing a set of anchor objects, wherein each anchor object has an anchorname which is a root name within a hierarchical naming space that represents a hierarchical logical network, wherein each anchorname is a unique name within the distributed data processing system, and wherein usage of an anchomame in combination with subnet information for a logical network supports unique addressing within a logical network;

means for generating a topology map,; and means for allowing an administrative user to select a display view of the topology map.

42. The apparatus of claim 41 wherein a display view of the topology map comprises a hierarchical tree view of all objects discovered by a user-specified distributed discovery controller.

43. The apparatus of claim 41 wherein a display view of the topology map comprises a hierarchical tree view of all objects discovered by a plurality of distributed discovery controllers.

44. The apparatus of claim 41 wherein a display view of the topology map comprises a hierarchical tree view of all objects discovered by all distributed discovery controllers for which a user has authorized access.

* * * * *